(12) United States Patent
Takahashi et al.

(10) Patent No.: US 7,856,168 B2
(45) Date of Patent: Dec. 21, 2010

(54) RECORDER/REPRODUCER AND CONTENT DATA PROTECTION SYSTEM FOR PREVENTING UNAUTHORIZED USE OF CONTENT

(75) Inventors: Jun Takahashi, Kyoto (JP); Masaya Miyazaki, Osaka (JP); Motoji Ohmori, Osaka (JP); Kaoru Yokota, Hyogo (JP); Toshihisa Nakano, Osaka (JP); Shunji Harada, Osaka (JP); Yoshikatsu Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 1126 days.

(21) Appl. No.: 10/593,727

(22) PCT Filed: Mar. 11, 2005

(86) PCT No.: PCT/JP2005/004360
§ 371 (c)(1),
(2), (4) Date: Sep. 21, 2006

(87) PCT Pub. No.: WO2005/103906
PCT Pub. Date: Nov. 3, 2005

(65) Prior Publication Data
US 2008/0239909 A1    Oct. 2, 2008

(30) Foreign Application Priority Data
Apr. 20, 2004  (JP) ............................ 2004-123911

(51) Int. Cl.
*H04N 5/76* (2006.01)
(52) U.S. Cl. ...................... 386/94; 380/201
(58) Field of Classification Search ............ 380/42, 380/33, 200, 201, 203; 386/94, 124–126, 386/109, E5.004; 725/31; 369/47.12
See application file for complete search history.

(56) References Cited

U.S. PATENT DOCUMENTS

| | | | |
|---|---|---|---|
| 7,130,251 B1 | 10/2006 | Morohashi | |
| 7,249,105 B1* | 7/2007 | Peinado et al. | ................. 705/56 |
| 7,298,844 B2 | 11/2007 | Sugimoto et al. | |
| 7,493,662 B2 | 2/2009 | Murase et al. | |
| 2002/0126843 A1 | 9/2002 | Murase et al. | |
| 2002/0143807 A1 | 10/2002 | Komatsu | |
| 2002/0150245 A1 | 10/2002 | Sugimoto et al. | |
| 2003/0149886 A1 | 8/2003 | Ito et al. | |
| 2004/0223245 A1 | 11/2004 | Morohashi | |

(Continued)

FOREIGN PATENT DOCUMENTS

EP        1 045 388        10/2000

(Continued)

*Primary Examiner*—David E Harvey
(74) *Attorney, Agent, or Firm*—Wenderoth, Lind & Ponack, L.L.P.

(57) ABSTRACT

The recorder/reproducer, when moving a first content data, writes a second content data, which is obtained by re-coding the first content data recorded in a first recording medium, into a second recording medium instead of the first content data, writes one or more first partial information extracted from the first content data into the second recording medium, and makes the first content data irreproducible, using one or more first invalidated partial information having one-to-one correspondence with the extracted one or more first partial information. When restoring the first content data, it makes the irreproducible first content data reproducible, using the one or more first partial information recorded in the second recording medium.

24 Claims, 19 Drawing Sheets

U.S. PATENT DOCUMENTS

| | | | |
|---|---|---|---|
| 2005/0141367 A1 | 6/2005 | Morohashi | |
| 2005/0185793 A1* | 8/2005 | LeComte et al. | 380/33 |
| 2005/0185821 A1* | 8/2005 | LeComte et al. | 382/100 |
| 2005/0193409 A1* | 9/2005 | LeComte et al. | 725/32 |
| 2006/0212564 A1 | 9/2006 | Morohashi | |
| 2008/0154408 A1 | 6/2008 | Morohashi | |

FOREIGN PATENT DOCUMENTS

| | | |
|---|---|---|
| EP | 1 087 398 | 3/2001 |
| EP | 1 233 414 | 8/2002 |
| EP | 1 248 433 | 10/2002 |
| EP | 1 249 836 | 10/2002 |
| JP | 2000-347946 | 12/2000 |
| JP | 2002-278859 | 9/2002 |
| JP | 2003-228522 | 8/2003 |
| JP | 2004/005816 | 1/2004 |
| WO | WO 2004/015996 * | 2/2004 |
| WO | WO 2004/032418 * | 4/2004 |
| WO | WO 2004/032478 * | 4/2004 |
| WO | WO 2004/032510 * | 4/2004 |

* cited by examiner

RECORDER/REPRODUCER AND CONTENT DATA PROTECTION SYSTEM FOR PREVENTING UNAUTHORIZED USE OF CONTENT

BACKGROUND OF THE INVENTION

1. Technical Field

The present invention relates to a recorder/reproducer intended for preventing an unauthorized use of content data and to a content data protection system that includes a portable medium, and particularly to technology for improving user convenience while preventing an unauthorized use of content data.

2. Background Art

With the commencement of BS digital broadcasting and terrestrial digital broadcasting, recent years have seen digital contents such as movies being extensively distributed. Since digital contents (hereinafter referred to as content data) are easy to replicate, there is rising concern for illicit acts such as unauthorized replication of content data protected by copyright and distribution of replicated content data over the Internet or on a recording medium or the like. Under these circumstances, there has been a technological development underway to suppress such illicit acts. Digital Transmission Content Protection (DTCP) is an example of such technology for protecting content data protected by copyright.

DTCP is a technology for preventing unauthorized copying of content data protected by copyright, such as by encrypting the content data when the content data is digitally transferred. In a content data protection technology such as DTCP, copy control information is given to content data.

Meanwhile, there is a demand for moving content data to another recording medium or another device even if the copying of such content data is prohibited by copy control information. For example, there is a case where content data protected by copyright recorded in a hard disc drive (HDD) included in a digital television, a recorder, or the like is wished to be moved to a portable recording medium such as a DVD-RAM, a Secure Digital (SD) card, in order to store such content data as a master copy. In this case, when the content data protected by copyright is moved from the HDD to a DVD-RAM, it is of course necessary to delete or to make irreproducible such content data protected by copyright recorded in the HDD.

Thus, it is a disadvantage to a user of the content data if both of the copy-source content data and the destination content data are lost in the middle of moving the content data, due to such factors as power breakdown, and they consequently become unusable as content data. Furthermore, it also generates an economic damage if the user needs to spend money to obtain again the same content data as the one that has become unusable.

In response to this, there is proposed a technology that allows content data to be moved without causing the loss of such content data, while preventing unauthorized copying of the content data (for example, refer to Patent Document 1).

Patent Document 1: Japanese Laid-Open Patent Application No. 2003-228522

However, in the case where the copy-source content data is content data with high image quality, and the recording capacity of the copy-destination is small compared with the size of the content data, such content data is usually moved after being compressed to a smaller size by degrading its image quality or the like before being moved. Thus, when the copy-source content data is invalidated, only the content data whose image quality has been degraded through compression conversion is left for the user. In other words, even when the content data is returned again to an HDD with a larger recording capacity, a high image quality of such content data cannot be restored, which results in the loss of the advantage of the user using such content data.

Furthermore, in the case where the content data is moved from an HDD to a portable recording medium, time required for moving the content data becomes longer, if such content data is moved simultaneously with the compression conversion, which results in the loss of the advantage of the user.

The present invention has been conceived in view of the above problems, and it is an object of the present invention to provide a recorder/reproducer and a content data protection system capable of: allowing for the moving of content data without causing the loss of the content data, while preventing unauthorized copying; restoring the original high image quality of the content data, even when its size is reduced through compression conversion, in the case of returning the content data to the copy-source; and allowing for an easy moving of the content data to a portable recording medium or to another recorder/reproducer.

SUMMARY OF THE INVENTION

In order to solve the above problems, the present invention includes (a) a content data moving unit that: writes a second content data into a second recording medium that is different from a first recording medium, the second content data being obtained by re-coding a first content data recorded in the first recording medium; writes a first partial information extracted from the first content data into the second recording medium; and makes the first content data irreproducible, using a first invalidated partial information corresponding to the extracted first partial information, and (b) a content data restoration unit that makes the irreproducible first content data reproducible, using the first partial information recorded in the second recording medium.

This makes it possible to make unusable the content data without having to delete the whole content data in the recorder/reproducer, by moving partial information of the content data at the time of moving the content data. In the case of returning the moved content data back to the recorder/reproducer, it is possible to restore the original high image quality of the content data by returning the partial information.

The recorder/reproducer of the present invention further includes (a) a content data obtainment unit that: accumulates the first content data; generates the second content data from the first content data; extracts the first partial information from the first content data; and makes the second content data irreproducible, using a second invalidated partial information that is generated based on the first partial information extracted from the first content data, wherein (2) the content data moving unit, when writing the second content data into the second recording medium, is that makes the irreproducible second content data reproducible, using a second partial information corresponding to the first partial information extracted from the first content data.

With this structure, the first content data is recorded and the second content data to be moved to a recording medium is generated in the recorder/reproducer, which is the copy-source of the content data. Then, by making unusable the second content data by invalidating a part of such generated second content data, a situation is circumvented where plural content data with different structures but with the same contents exist simultaneously in the same terminal device. In the case of moving the second content data into the recording medium, it is possible to move the second content data to the recording medium at a higher speed by decoding and re-coding only the invalidated partial information in the first content data, than in the case of converting and moving the whole content data at the time of moving it.

Note the present invention may be embodied not only as the recorder/reproducer, but also as: a method of controlling the recorder/reproducer (hereinafter referred to as the recording/reproduction control method); a recording/reproduction control program for causing a computer to execute the recording/reproduction control method; and a recording medium in which the recording/reproduction control program is recorded.

Also note that the present invention may also be embodied as: a system LSI embedded with a function for protecting a content protected by copyright, by being implemented in the recorder/reproducer (hereinafter referred to as the content data protection function); an IP core for forming the content data protection function in a programmable logic device such as Field Programmable Gate Array (FPGA) and Complex Programmable Logic Device (CPLD) (hereinafter referred to as the content data protection core); and a recording medium in which the content data protection core is recorded.

As described above, according to the present invention, the recorder/reproducer, being the copy-source of the content data, makes unusable the content data without having to delete the whole content data in the recorder/reproducer, by moving partial information of the content data at the time of moving the content data. In the case of returning the moved content data back to the recorder/reproducer, it is possible to restore the original high image quality of the content data by returning the partial information.

Furthermore, according to the present invention, the recorder/reproducer, being the copy-source of the content data, records the first content data and generates the second content data to be moved to a recording medium instead of the first content data. Then, by making unusable the second content data by invalidating a part of such generated second content data, a situation is circumvented where plural content data with different structures but with the same contents exist simultaneously in the same terminal device. In the case of moving the second content data into the recording medium, it is possible to move the second content data to the recording medium at a higher speed by decoding and re-coding only the invalidated partial information, than in the case of converting and moving the whole content data at the time of moving it.

Furthermore, according to the present invention, it is possible to reduce the time for re-conversion required for moving content data and to reduce the amount of data of partial information recorded in a recording medium, by selectively moving partial information.

NUMERICAL REFERENCES

Figure 1:
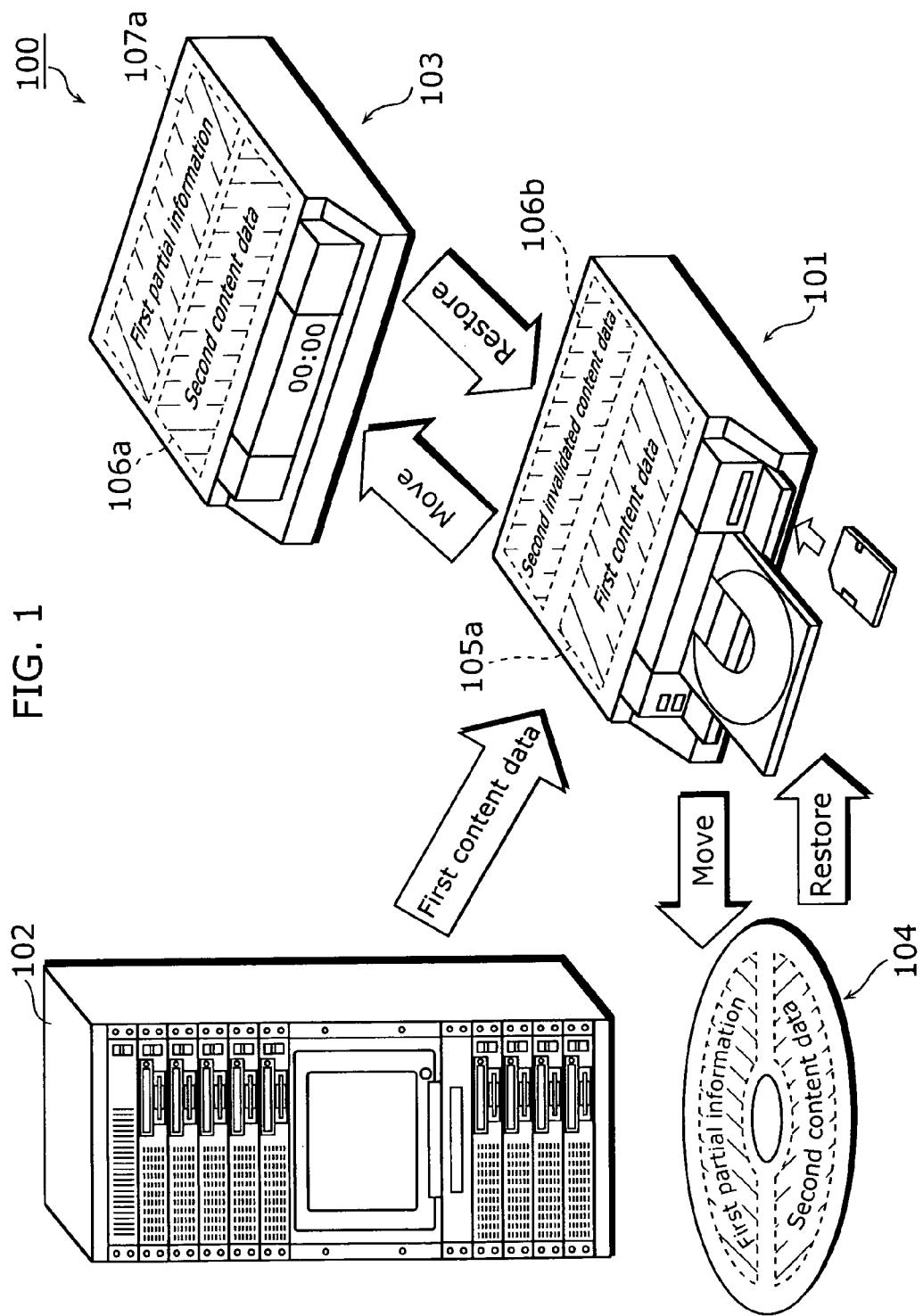
FIG. 1 is a diagram showing an overview of a content data protection system according to an embodiment of the present invention.

100 Content data protection system
101 Recorder/reproducer
102 Content data supply device
103 Recorder/reproducer
104 Portable medium
105 Partial information recording area
106 Content data recording area
111 First content data reception unit
112 First content data recording unit
113 Invalidation/validation selection unit
114 Decoding unit
115 Coding unit
116 Second content data invalidation unit
117 Second invalidated content data recording unit
118 Second invalidated content data validation unit
119 Reading and writing unit
120 First content data invalidation unit
121 Second invalidated content data validation unit
122 First content data analysis unit
123 First content data invalidation/validation determination unit
124 Second invalidation data generation unit
125 Second invalidation data synthesis unit
126 Second invalidated content data synthesis unit
127 First invalidation data generation unit
128 First invalidation data synthesis unit 129 First invalidated content data synthesis unit
130 First partial information analysis unit

DETAILED DESCRIPTION OF THE INVENTION

Embodiment

The following describes an embodiment of the present invention with reference to the drawings.

The recorder/reproducer of the present embodiment, when moving a first content data, writes, into a second recording medium, a second content data, which is obtained by re-coding the first content data, instead of the first content data, writes one or more first partial information extracted from the first content data into the second recording medium, and makes the first content data irreproducible, using one or more first invalidated partial information having one-to-one correspondence with the extracted one or more first partial information. Furthermore, when restoring the first content data, the recorder/reproducer makes the irreproducible first content data reproducible, using the one or more first partial information recorded in the second recording medium.

Furthermore, the recorder/reproducer of the present embodiment, when having obtained the first content data, accumulates the first content data, generates the second content data from the first content data, extracts one or more first partial information from the first content data, makes the generated second content data irreproducible, using one or more second invalidated partial information that are generated based on the extracted one or more first partial information. Furthermore, when writing the second content data into the second recording medium instead of the first content data, the recorder/reproducer extracts one or more first partial information from the first content data, and makes the irreproducible second content data reproducible, using one or more second partial information having one-to-one correspondence with the extracted one or more first partial information.

The "first content data" is content data that is coded in accordance with a first coding scheme.

The "second content data" is content data that is one of: content data whose size is reduced in accordance with the first coding scheme; and content data that is coded in accordance with a second coding scheme, which is different from the first coding scheme.

The "second content data" is content data that is coded in accordance with the second coding scheme, which is different from the first coding scheme.

The "first invalidated content data" is the first content data that has become irreproducible as it is, by one or more blocks of its data being invalidated.

The "second invalidated content data" is the second content data that has become irreproducible as it is, by one or more blocks of its data being invalidated.

The "first partial information" is data of a block to be invalidated in the first content data.

The "second partial information" is data of a block to be invalidated in the second content data.

The "first invalidated partial information" is data of a block that has been invalidated in the first content data.

The "second invalidated partial information" is data of a block that has been invalidated in the second content data.

Based on the above, a description is given of the recorder/reproducer of the present embodiment.

As shown in FIG. 1, a recorder/reproducer 101 of the present embodiment records a first content data supplied from a content data supply device 102 onto, for example, a recording device such as a hard disk drive (HDD) included in the recorder/reproducer 101. Furthermore, the recorder/reproducer 101 moves, to one of a recorder/reproducer 103 and a portable medium 104 or the like, the first content data or a second content data that is obtained by degrading the image quality of the first content data, according to a user operation. Moreover, the recorder/reproducer 101 deletes or makes irreproducible the first content data supplied from the content data supply device 102.

Note that in the case of moving the first content data or the second content data to the copy-destination, authentication processing is performed before moving the content data to check whether or not such copy-destination is an authorized device or an authorized portable medium. An encryption technique required for the authentication processing is in accordance with the procedures defined by the Digital Transmission Content Protection (DTCP) specification, or in accordance with known techniques disclosed in Reference Document 1 and Reference Document 2 shown-below, and the like, and therefore its details are not mentioned here.

[Reference Document 1], *"Gendai Angou Riron* (Contemporary Encryption Theory)", Nobuichi IKENO, Kenji KOYAMA, Institute of Electronics, Information and Communication Engineers (COLONA PUBLISHING CO., LTD).

[Reference Document 2], *"Angou Riron Nyumon* (Introduction to Encryption Theory)", Eiji OKAMOTO, KYORITSU SHUPPAN CO., LTD.

Note that, if necessary, the second content data may be recorded in encrypted form, and such second content data may be moved after being decrypted at the point of time when it is to be moved.

The following description is given for the case where the second content data, which is obtained by re-coding the first content data, is moved to the portable medium 104, instead of the first content data supplied from an external device such as the content data supply device 102, and then is returned from such copy-destination to the recorder/reproducer 101.

Figure 2:
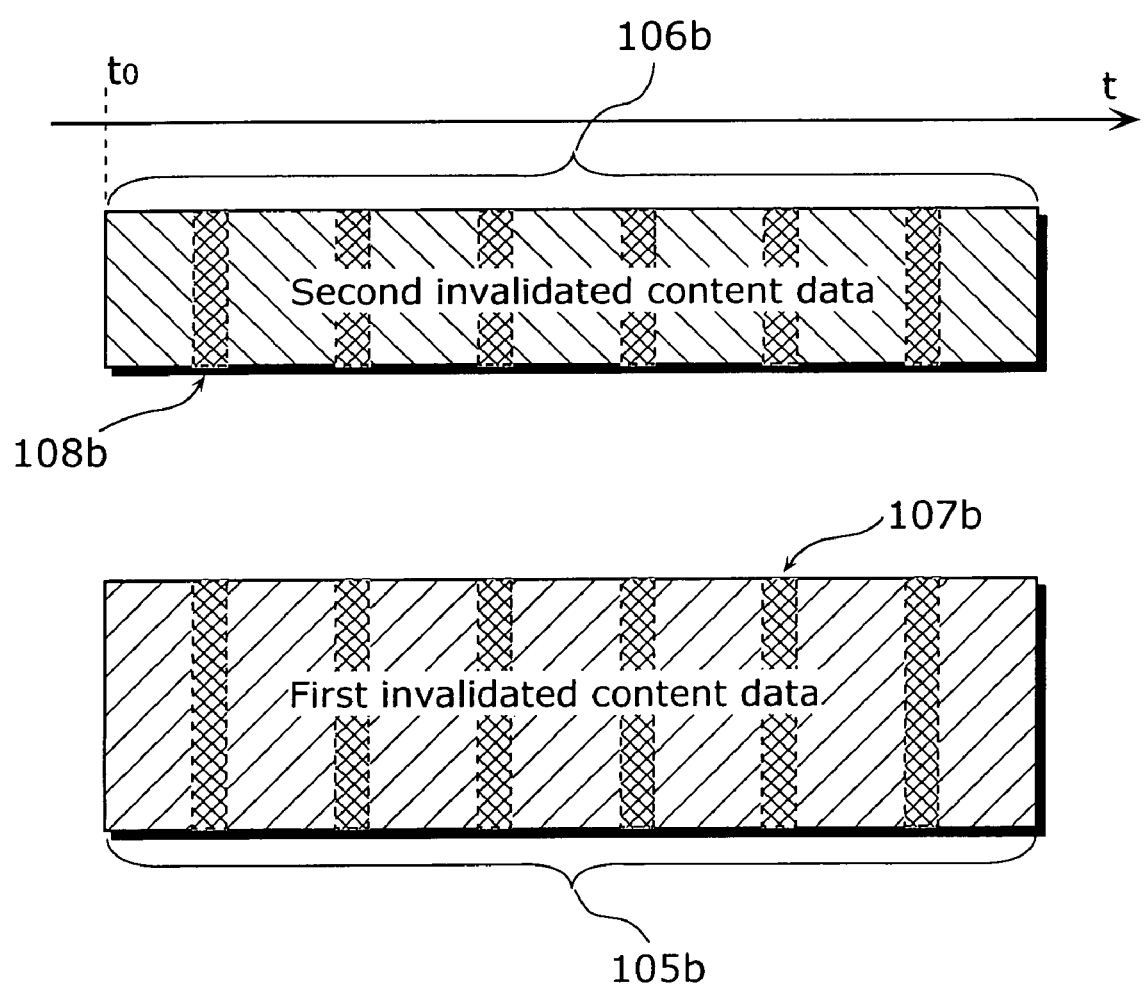
FIG. 2 is a diagram showing data structures of a first invalidated content data and a second invalidated content data according to the embodiment of the present invention.

Note that, as shown in FIG. 1 and FIG. 2, upon obtainment of a first content data 105a, the recorder/reproducer 101 accumulates the first content data 105a, and generates a second content data 106a from the first content data 105a. Furthermore, the recorder/reproducer 101 extracts one or more first partial information 107a from the first content data 105a, and makes the generated second content data 106a irreproducible, using one or more second invalidated partial information 108b generated based on such extracted one or more first partial information 107a.

When moving the first content data 105a, the recorder/reproducer 101 writes, to the recorder/reproducer 103 or the portable medium 104, the second content data 106a, which is obtained by re-coding the first content data 105a, instead of writing the first content data 105a, and writes, to the recorder/reproducer 103 or the portable medium 104, one or more first partial information 107a extracted from the first content data 105a, and makes the first content data 105a irreproducible, using one or more first invalidated partial information 107b having a one-to-one correspondence with the extracted one or more first partial information. When restoring the first content data 105a, the recorder/reproducer 101 makes reproducible the irreproducible first content data, i.e., a first invalidated content data 105b, using one or more first partial information 107a recorded in the recorder/reproducer 103 or the portable medium 104.

When writing the second content data 106a to the recorder/reproducer 103 or the portable medium 104 instead of writing the first content data 105a, the recorder/reproducer 101 extracts one or more first partial information 107a from the first content data 105a, and makes reproducible the irreproducible second content data, i.e., a second invalidated content data 106b, using one or more second partial information (not illustrated in the drawing) having a one-to-one correspondence with the extracted one or more first partial information 107a.

Note that a first partial information recording area 105 is an area to which only a device which has passed authentication with the portable medium 104 is allowed to write data.

Next, the structure of the recorder/reproducer 101 is described.

Figure 3:
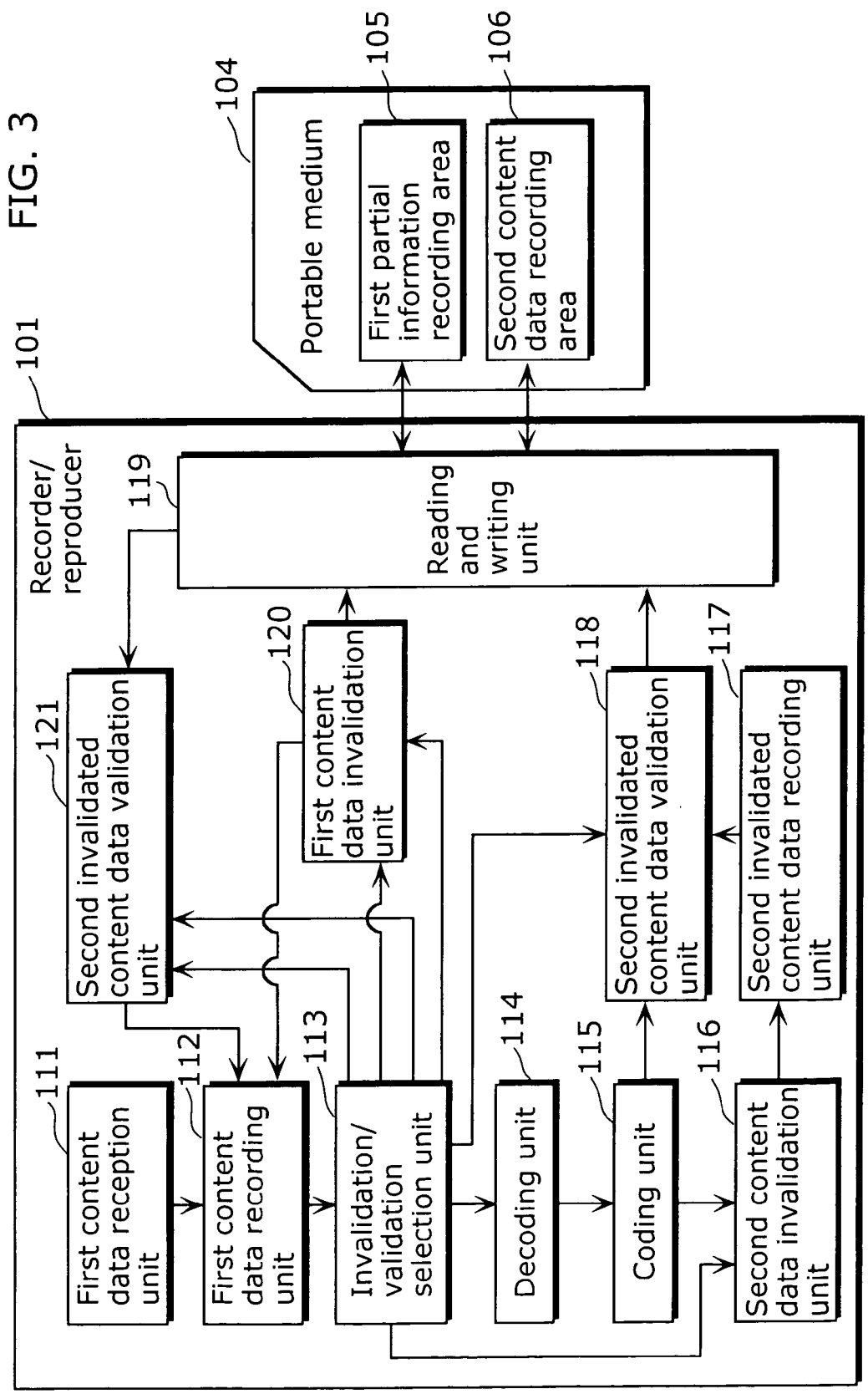
FIG. 3 is a diagram showing a structure of a recorder/reproducer according to the embodiment of the present invention.

Here, as shown in FIG. 3, the recorder/reproducer 101 includes, for example, a first content data reception unit 111, a first content data recording unit 112, an invalidation/validation selection unit 113, a decoding unit 114, a coding unit 115, a second content data invalidation unit 116, a second invalidated content data recording unit 117, a second invalidated content data validation unit 118, a reading and writing unit 119, a first content data invalidation unit 120, and a second invalidated content data validation unit 121, or the like.

Note that, although not illustrated in the drawing, the recorder/reproducer 101 includes a nonvolatile recording device, an I/O interface, a reading and writing device, a system LSI, and a processing device that processes a program for controlling these units, or the like.

The first content data reception unit 111 receives a first content data from an external device. An example of this is a tuner for receiving digital broadcasting, an I/O interface that serves as a window through which data communication is carried out with an external device, or the like.

The first content data recording unit 112 records the received first content data. An example of this is a nonvolatile recording device to which a recording area for a first content data is allocated.

The invalidation/validation selection unit 113 selects a portion to be validated/invalidated, based on the first content data recorded in the first content data recording unit 112. An example of this is an invalidation/validation selection unit formed in a system LSI, and a processing device that is executing an invalidation/validation selection program recorded in a nonvolatile recording device, or the like.

The decoding unit 114 decodes the first content data. An example of this is a decoding unit formed in a system LSI, and a processing device that is executing a decoding program recorded in a nonvolatile recording device, or the like.

The coding unit 115 codes, using a second coding scheme, data that is coded using a first coding scheme. The coding unit 115 generates a second content data based on the decoded first content data. An example of this is a coding unit formed in a system LSI, and a processing device that is executing a coding program recorded in a nonvolatile recording device, or the like.

The second content data invalidation unit 116 invalidates a portion (partial information) of the second content data which has been converted as a result of the selection of the invalidation/validation selection unit 113. An example of this is a first invalidation unit formed in a system LSI, and a processing device that is executing a first invalidation program recorded in a nonvolatile recording device, or the like.

The second invalidated content data recording unit 117 records the invalidated second content data. An example of this is a nonvolatile recording device to which a recording area for a second invalidated content data is allocated.

The second invalidated content data validation unit 118 validates the second content data when the invalidated second content data is to be moved to the portable medium 104. An example of this is a first validation unit formed in a system LSI, and a processing device that is executing a first validation program recorded in a nonvolatile recording device, or the like.

The reading and writing unit 119 reads from or writes to the portable medium 104 the partial information extracted by the first content data invalidation unit 120 and the second content data. An example of this is a reading and writing device connected to the I/O interface, and a processing device that is executing a reading and writing program recorded in a nonvolatile recording device, or the like.

The first content data invalidation unit 120 invalidates the first content data. An example of this is a second invalidation unit formed in a system LSI, and a processing device that is executing a second invalidation program recorded in a nonvolatile recording device, or the like.

The second invalidated content data validation unit 121 validates the first content data invalidated by the first content data invalidation unit 120. An example of this is a second validation unit formed in a system LSI, and a processing device that is executing a second validation program recorded in a nonvolatile recording device, or the like.

Figure 4:
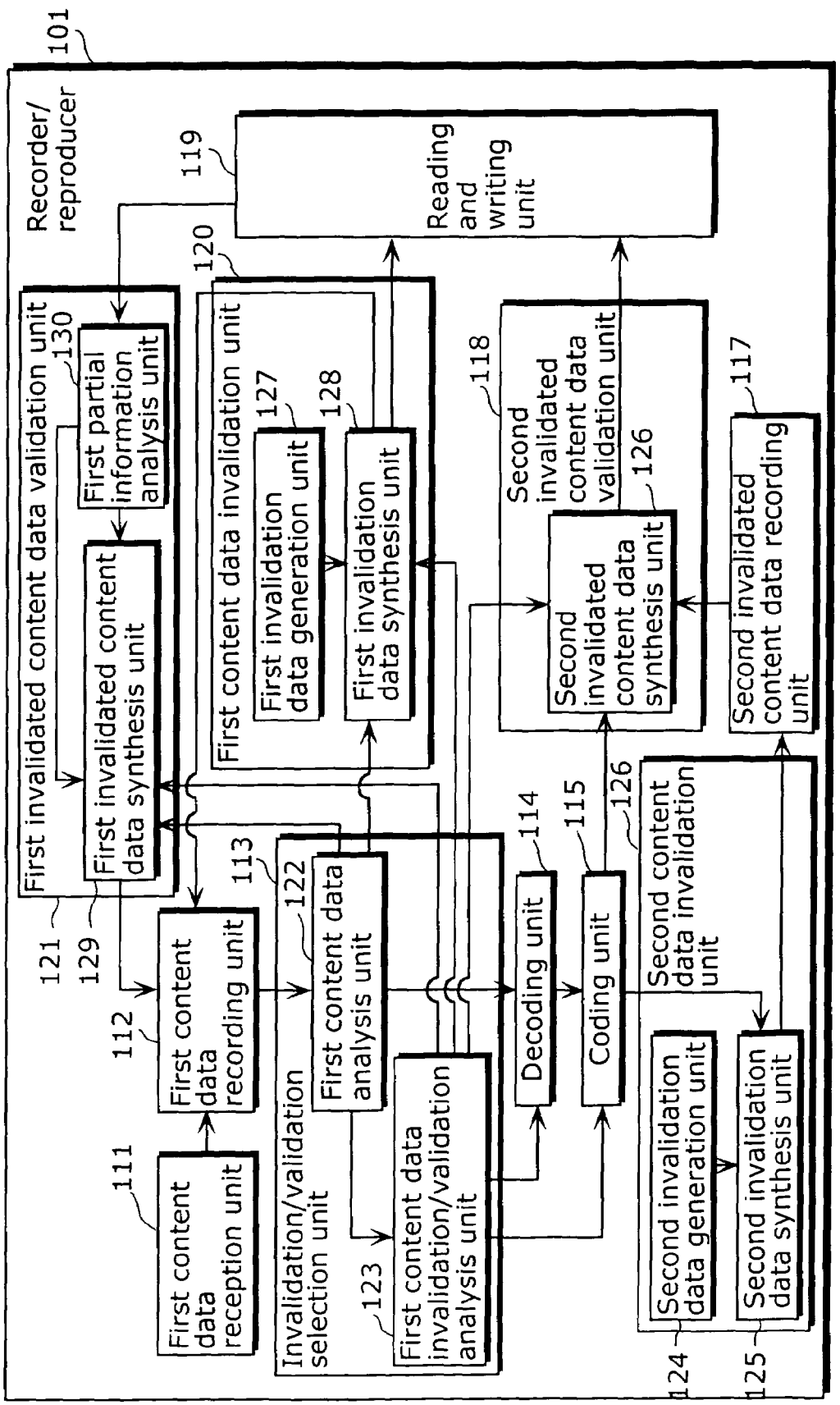
FIG. 4 is a diagram showing a detailed structure of the recorder/reproducer according to the embodiment of the present invention.

Furthermore, as shown in FIG. 4, the invalidation/validation selection unit 113, the second invalidated content data validation unit 118, the first content data invalidation unit 120, and the second invalidated content data validation unit 121 are structured as (1) to (4) described below, respectively.

(1) The invalidation/validation selection unit 113 includes a first content data analysis unit 122, and a first content data invalidation/validation determination unit 123, or the like.

The first content data analysis unit 122 reads the first content data recorded in the first content data recording unit 112, and analyzes the readout first content data.

The first content data invalidation/validation determination unit 123 identifies a first partial information to be invalidated in the first content data. It also identifies a first invalidated partial information to be validated in the first invalidated content data.

The second content data invalidation unit 116 includes a second invalidation data generation unit 124, and a second invalidation data synthesis unit 125, or the like.

The second invalidation data generation unit 124 generates invalidation data for invalidating a second partial information.

The second invalidation data synthesis unit 125 synthesizes the second content data and the invalidation data, so as to invalidate the second content data.

(2) The second invalidated content data validation unit 118 includes a second invalidated content data synthesis unit 126, or the like.

The second invalidated content data synthesis unit 126 synthesizes the second invalidated content data recorded in the second invalidated content data recording unit 117 and the second partial information transferred from the coding unit 115, based on the determination made by the first content data invalidation/validation determination unit 123, so as to validate the second invalidated content data, and records the validated second invalidated content data, i.e., the second content data, to a content data recording area 106 in the portable medium 104 via the reading and writing unit 119.

(3) The first content data invalidation unit 120 includes a first invalidation data generation unit 127, and a first invalidation data synthesis unit 128, or the like.

The first invalidation data generation unit 127 generates invalidation data for invalidating a first partial information.

The first invalidation data synthesis unit 128 synthesizes the first content data and the invalidation data, so as to invalidate the first content data.

(4) The second invalidated content data validation unit 121 includes a first partial information analysis unit 130, and a first invalidated content data synthesis unit 129, or the like.

The first partial information analysis unit 130 reads a first partial information from the partial information recording area 105 in the portable medium 104 via the reading and writing unit 119, analyzes the readout first partial information, and transfers the result of the analysis and the analyzed first partial information to the first invalidated content data synthesis unit 129.

The first invalidated content data synthesis unit 129 synthesizes the first invalidated content data recorded in the first content data recording unit 112 and the first partial information transferred from the first partial information analysis unit 130, based on the determination made by the first content data invalidation/validation determination unit 123, so as to validate the first invalidated content data, and records the validated first invalidated content data, i.e., the first content data, to the first content data recording unit 112.

Next, a description is given of an area to be selected by the invalidation/validation selection unit 113.

The following description is given by taking, as an example, a reference relationship in inter-picture difference coding used in MPEG-1, MPEG-2, MPEG-4, MPEG-4AVC (ITU-T H.264), and the like.

Figure 5:
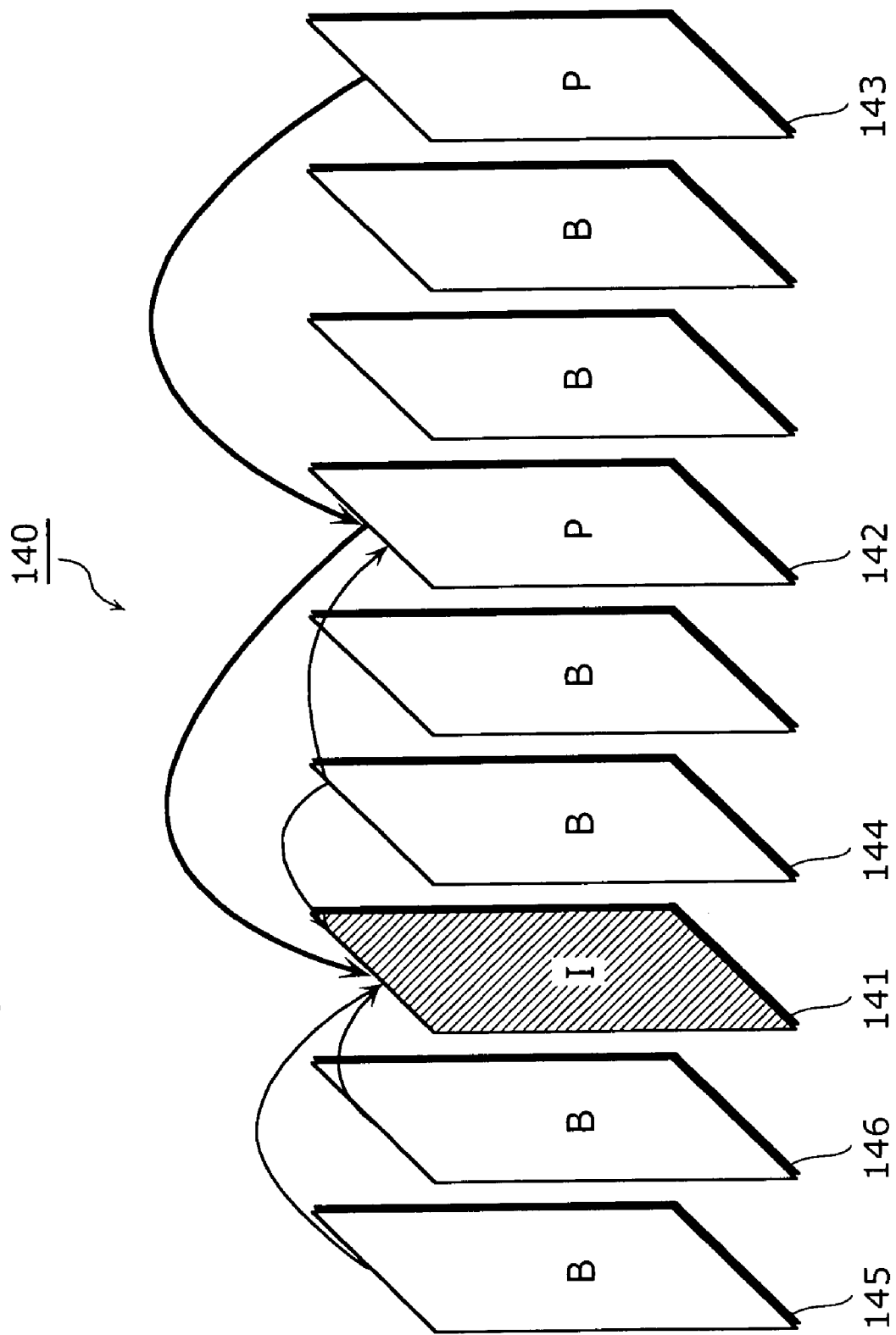
FIG. 5 is a diagram showing a reference relationship at the time of inter-picture frame coding of MPEG coding.

Note that, as shown in FIG. 5, inter-picture difference coding is a scheme for determining a difference between a reference picture, based on which a difference is obtained, and a picture to be coded, and compressing and coding the difference area by means of orthogonal conversion or the like.

Note that pictures 1402 to 1408 are pictures, corresponding to the respective times, which are arranged in display order.

For example, a difference between the picture 1402 and the picture 1400 is determined, and a difference error is coded. There is also the case where differences are determined, as in the case of the picture 1406, between both the picture 1400 and the picture 1406, and between the picture 1402 and the picture 1406, and errors are coded.

Meanwhile, the picture 1400, which is coded by intra-picture coding scheme, is decodable on its own without reference to other pictures. Such picture is referred to as an I-Picture. Since an I-Picture is reproducible on its own, it serves as a starting point when content reproduction is to be performed in the middle of the content and the like, and is referred to by another picture to be coded by difference coding. Since an I-Picture serves as a key picture, it is also referred to as a key frame.

Thus, by invalidating this key frame, i.e., by making it irreproducible, it becomes impossible for all pictures referring to this key frame to be completely reproduced.

Next, a description is given of a unit of coding of a picture (Picture) to be coed by the coding unit 115.

Figure 6:
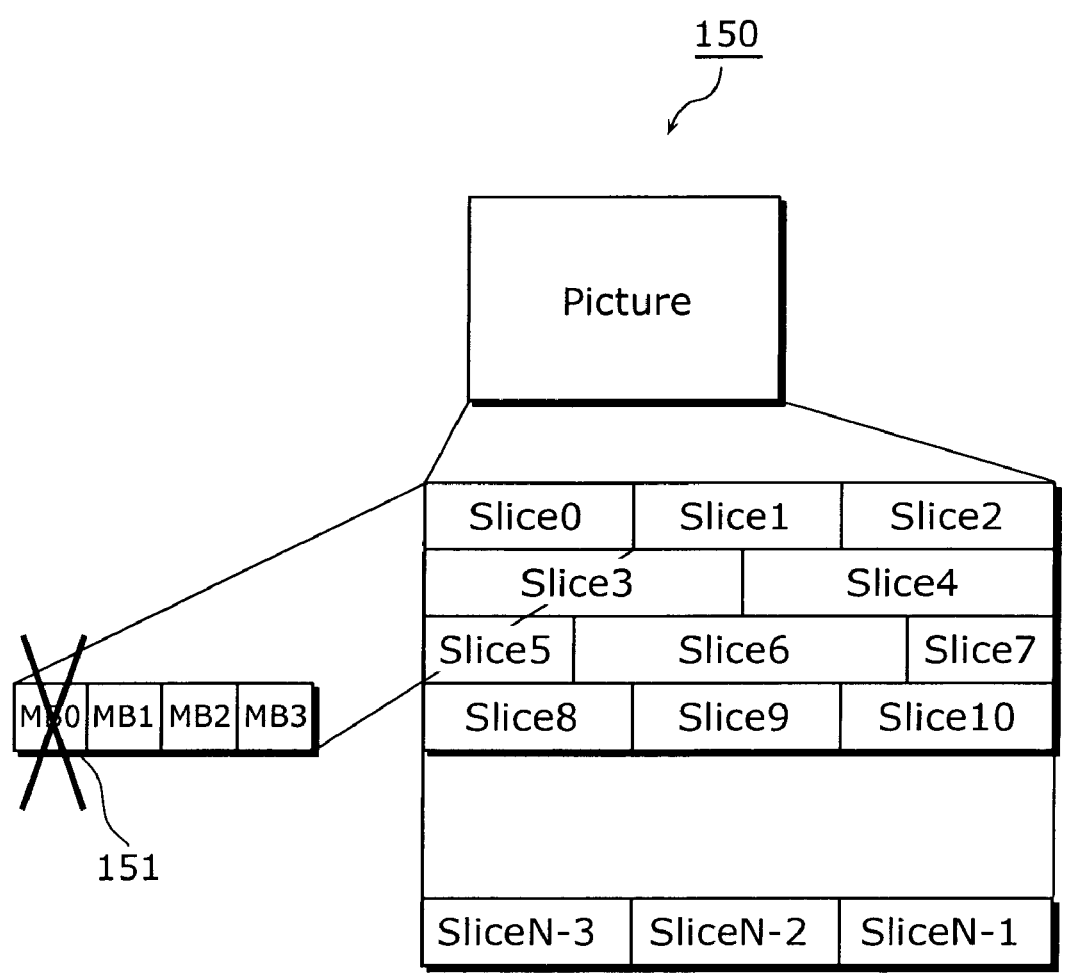
FIG. 6 is a diagram showing a data structure of picture/slice/macroblock in MPEG coding.

As shown in FIG. 6, in coding schemes such as MPEG-1, MPEG-2, MPEG-4, and MPEG-4AVC (ITU-T H.264), a single picture (Picture) is coded after being divided into areas called slices, each of which is made up of plural macroblocks 1500.

Data of plural macroblocks are contiguously arranged in a slice, and thus if data of the macroblock at the top of a slice cannot be decoded successfully, all data of the macroblocks in the slice cannot be decoded successfully. This means that, complete decoding of one picture is made impossible by invalidating data of the top macroblock in each slice.

Thus, by invalidating the top data in each slice included in an I-Picture, it becomes possible to invalidate all picture data included in content data that is coded in accordance with MPEG-1, MPEG-2, MPEG-4, and MPEG-4AVC (ITU-H.264).

It is possible to determine which one of intra-picture coding (I-Picture) and inter-picture coding (P-Picture or B-Picture) is selected as a coding scheme, by analyzing a part of coded data.

Figure 7:
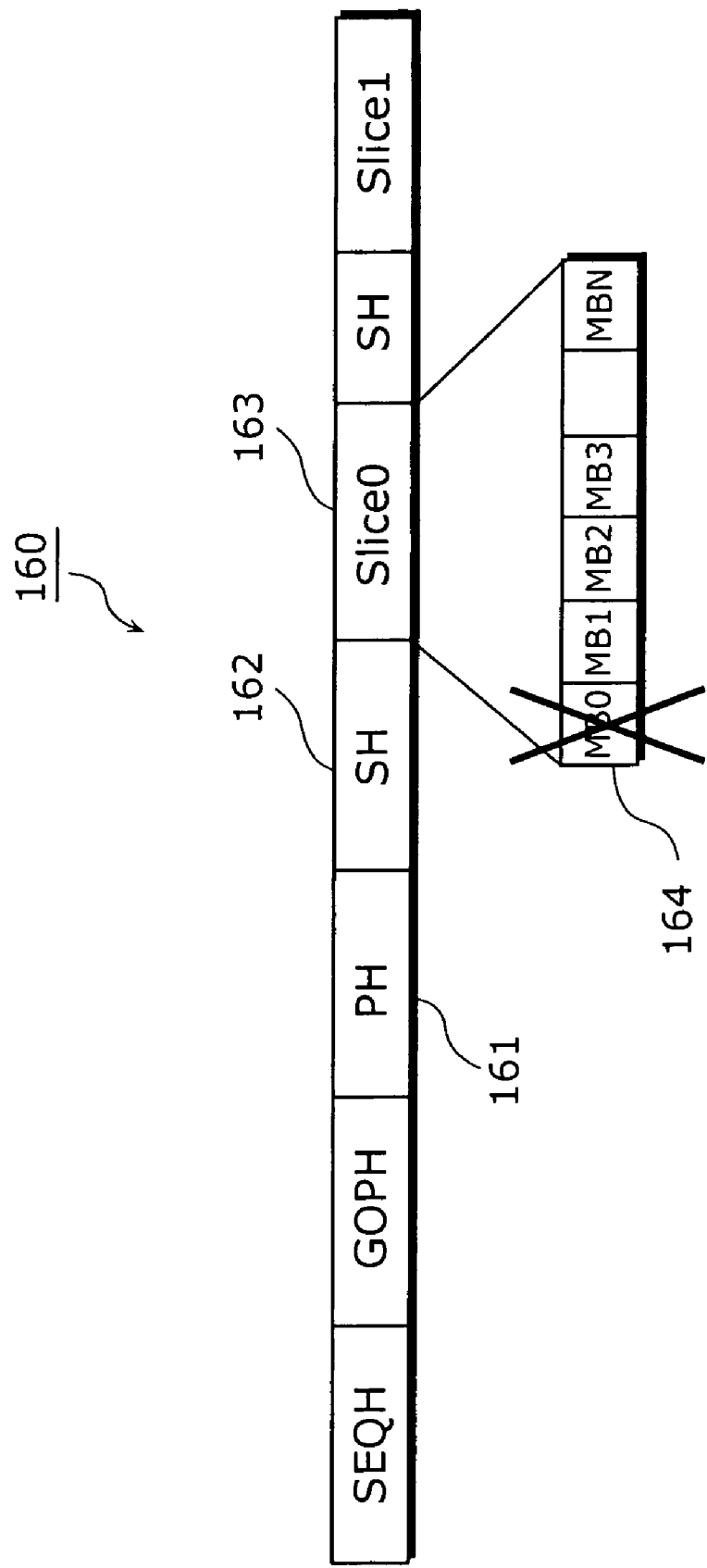
FIG. 7 is a diagram showing a syntax in MPEG-2 video coding.

For example, according to MPEG-2 Syntax, as shown in FIG. 7, it is possible to make this determination based on information picture_coding_type included in a picture header (PH) in which picture information is stored.

Figure 8:
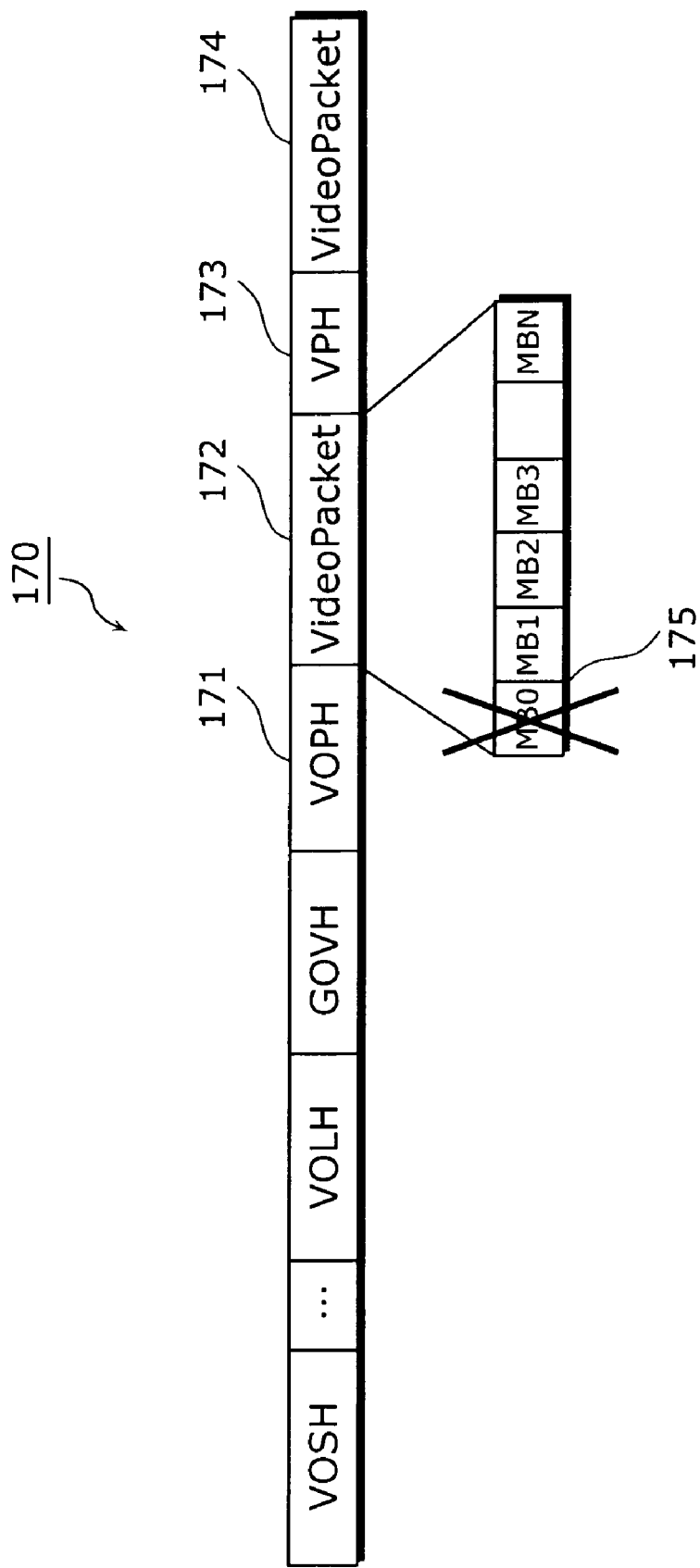
FIG. 8 is a diagram showing a syntax in MPEG-4 video coding.

According to MPEG-4 Syntax, as shown in FIG. 8, it is possible to determine the coding scheme based on information indicating vop_coding_type stored in vop_header (VOPH). According to MPEG-4, in particular, information indicating vop_coding_type is included also in information indicating video packet header (VPH) included in a video packet which is equivalent to an MPEG-2 slice.

Figure 9:
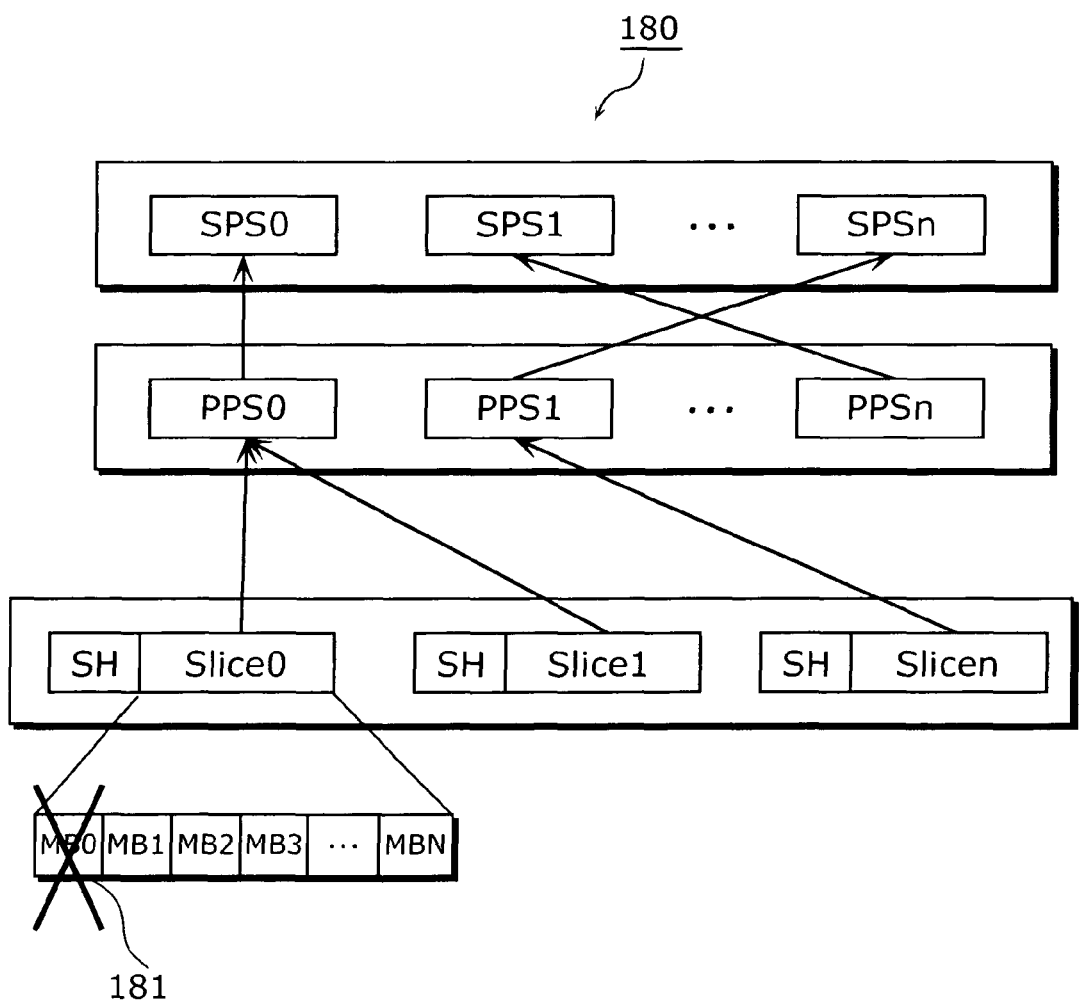
FIG. 9 is a diagram showing a syntax in MPEG-4 AVC (H.264) video coding.

According to MPEG-4AVC (H.264), as shown in FIG. 9, it is possible to make this determination based on information Slice_type inserted in each slice.

Next, a description is given of the operations performed by the recorder/reproducer 101 with the above structure. The following describes the operations to be performed at the time of obtaining content data, at the time of moving the content data, and at the time of restoring the content data in order of mention.

First, a description is given of the operation performed by the recorder/reproducer 101 at the time of obtaining content data.

Figure 10:
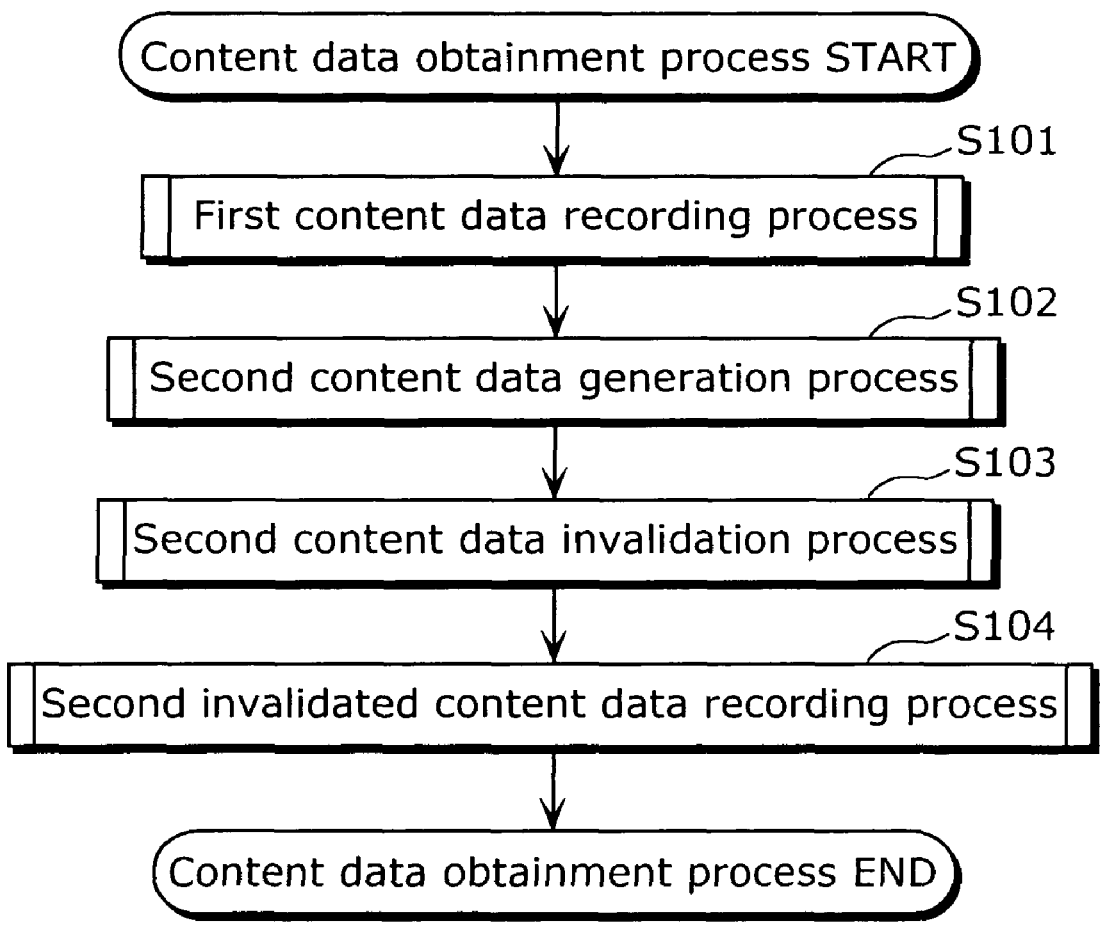
FIG. 10 is a first diagram showing an operation performed by the recorder/reproducer according to the embodiment of the present invention at the time of obtaining content data.

As shown in FIG. 10, the recorder/reproducer 101, in the case of obtaining content data supplied by the content data supply device 102, executes a first content data recording process (S101), a second content data generation process (S102), a second content data invalidation process (S103), and a second invalidated content data recording process (S104). Then, the recorder/reproducer 101 generates a second content data to be moved to the portable medium 104 instead of the first content data recorded in the first content data recording unit 112, and records such generated second content data onto the second invalidated content data recording unit 117 in an invalidated state.

The "first content data recording process" refers to a process of recording the first content data onto the first content data recording unit 112.

The "second content data generation process" refers to a process of generating a second content data from the first content data recorded in the first content data recording unit 112.

The "second content data invalidation process" refers to a process of invalidating the whole of the second content data by invalidating a second partial information.

The "second invalidated content data recording process" refers to a process of recording the second invalidated content data onto the second invalidated content data recording unit 117.

Figure 11:
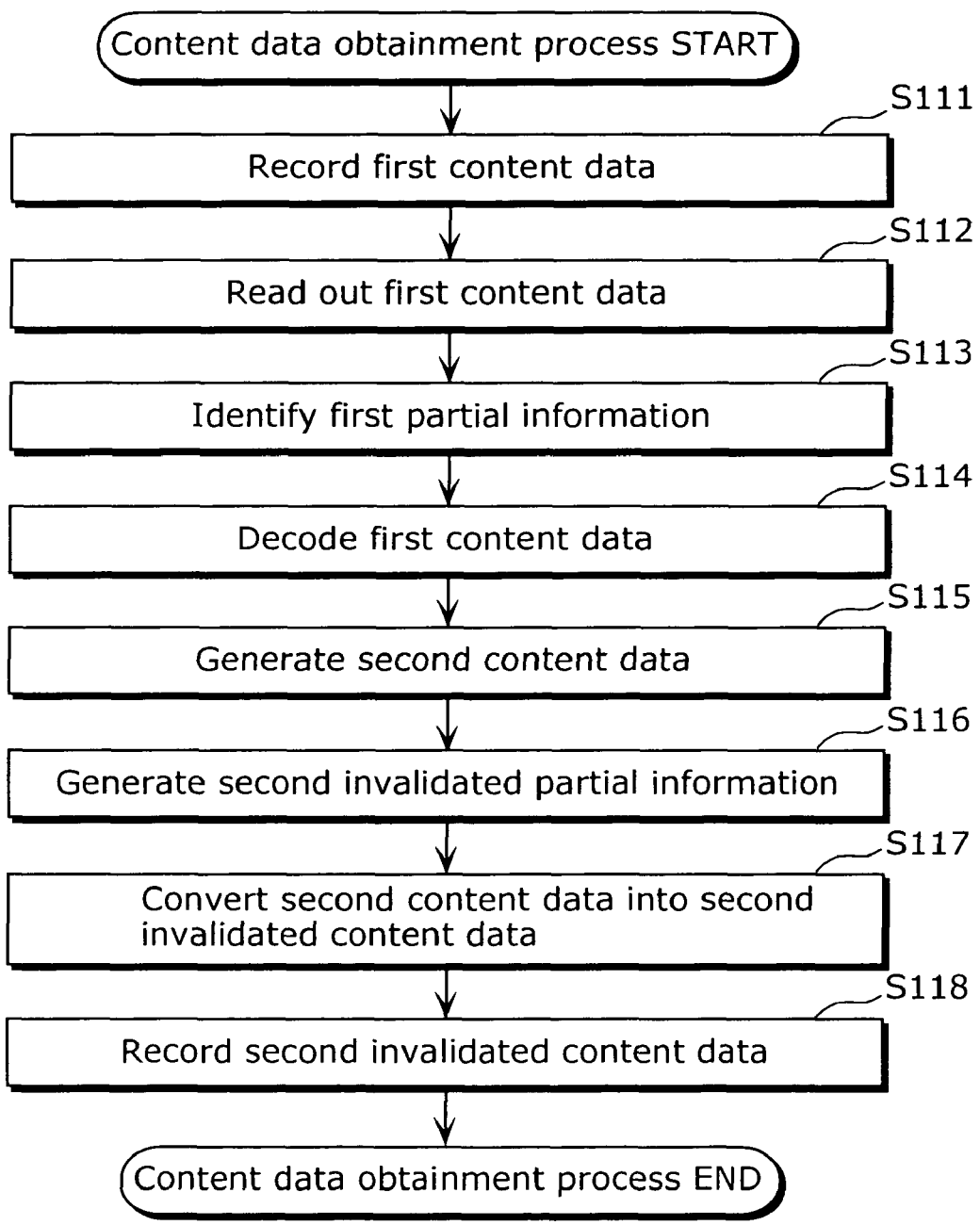
FIG. 11 is a second diagram showing an operation performed by the recorder/reproducer according to the embodiment of the present invention at the time of obtaining the content data.

To be more specific, as shown in FIG. 11, in the recorder/reproducer 101, the first content data reception unit 111 records, into the first content data recording unit 112, a first content data received from an external device such as the content data supply device 102 (S111). The invalidation/validation selection unit 113 reads the first content data recorded in the first content data recording unit 112 (S112), and identifies a first partial information from the readout first content data (S113). Furthermore, the decoding unit 114 decodes the first content data read by the invalidation/validation selection unit 113 (S114). The coding unit 115 codes the first content data decoded by the decoding unit 114 based on the second coding scheme, so as to generate a second content data (S115). The second content data invalidation unit 116 invalidates a second partial information, in the second content data generated by the coding unit 115, corresponding to the first partial information identified by the invalidation/validation selection unit 113, converts the second content data into a second invalidated content data (S117), and records such second invalidated content data into the second invalidated content data recording unit 117 (S118).

At this time, in the invalidation/validation selection unit 113, the first content data analysis unit 122 reads the first content data recorded in the first content data recording unit 112, and analyzes such readout first content data. The result of the analysis is transferred to the first content data invalidation/validation determination unit 123, and the analyzed first content data is transferred to the decoding unit 114. The first content data invalidation/validation determination unit 123 determines whether or not the first partial information corresponds to the second invalidated partial information, based on the result of the analysis made by the first content data analysis unit 122. The result of such determination is transferred to the coding unit 115 and the second invalidation data synthesis unit 125.

Furthermore, in the second content data invalidation unit 116, the second invalidation data generation unit 124 generates a second invalidated partial information. The second invalidation data synthesis unit 125 synthesizes the second content data transferred from the coding unit 115 and the second invalidated partial information transferred from the second invalidation data generation unit 124, based on the determination made by the first content data invalidation/validation determination unit 123, so as to invalidate the second invalidated content data, and records the invalidated second content data, i.e., the second invalidated content data, to the second invalidated content data recording unit 117.

Note that in the invalidation/validation selection unit 113, in the case where the first content data is coded in accordance with MPEG-2 and the second content data is coded in accordance with MPEG-4, the first content data analysis unit 122 analyzes the PH in which information about each picture included in the first content data is stored, and the first content data invalidation/validation determination unit 123 determines that each picture indicated as I-Picture by picture_coding_type included in the PH analyzed by the first content data analysis unit 122, should be invalidated (refer to FIG. 7).

Meanwhile, in the second content data invalidation unit 116, the second invalidation data synthesis unit 125 replaces the top 1-byte data in a macroblock 1600 positioned immediately after the VOPH 1702 or VPH 1704 of MPEG-4 by a second invalidated partial information generated by the second invalidation data generation unit 124 (refer to FIG. 8).

Next, a description is given of the operation performed by the recorder/reproducer 101 at the time of moving the content data.

Figure 12:
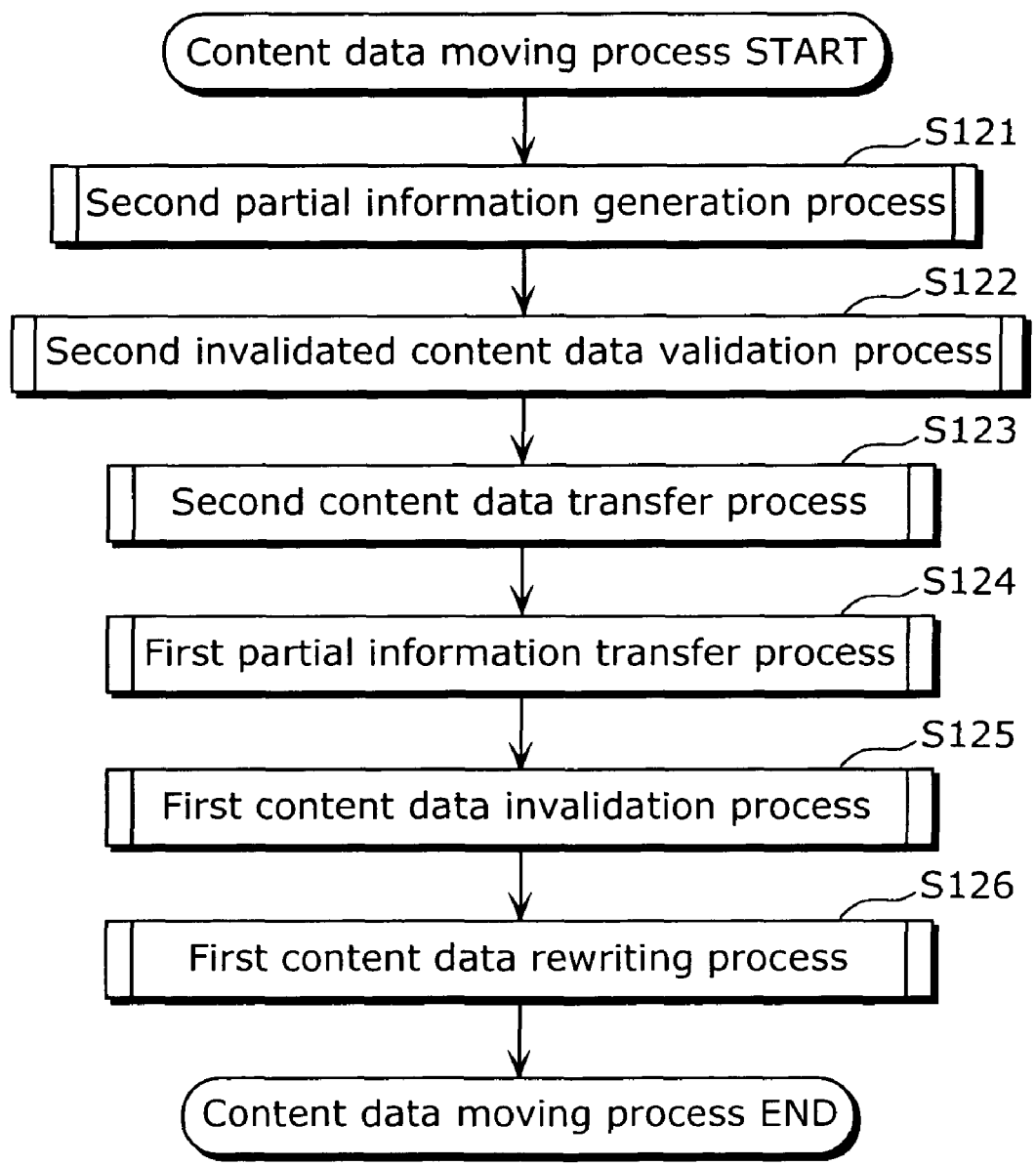
FIG. 12 is a first diagram showing an operation performed by the recorder/reproducer according to the embodiment of the present invention at the time of moving the content data.

As shown in FIG. 12, the recorder/reproducer 101, in the case of moving the obtained content data to either the recorder/reproducer 103 or the portable medium 104, executes a second partial information generation process (S121), a second invalidated content data validation process (S122), a second content data transfer process (S123), a first partial information transfer process (S124), a first content data invalidation process (S125), and a first content data rewriting process (S126). Then, the recorder/reproducer 101 validates the second invalidated content data recorded in the second invalidated content data recording unit 117, and moves it to the portable medium 104.

The "second partial information generation process" refers to a process of generating a second partial information from a first partial information.

The "second invalidated content data validation process" refers to a process of validating the second invalidated content data recorded in the second invalidated content data recording unit 117, using the second partial information.

The "second content data transfer process" refers to a process of writing the second content data into the content data recording area 106 in the portable medium 104.

The "first partial information transfer process" refers to a process of writing the first partial information into the partial information recording area 105 in the portable medium 104.

The "first content data invalidation process" refers to a process of invalidating the whole of the first content data by invalidating the first partial information.

The "first content data rewriting process" refers to a process of rewriting the first content data recorded in the first content data recording unit 112 with a first invalidated content data.

Figure 13:
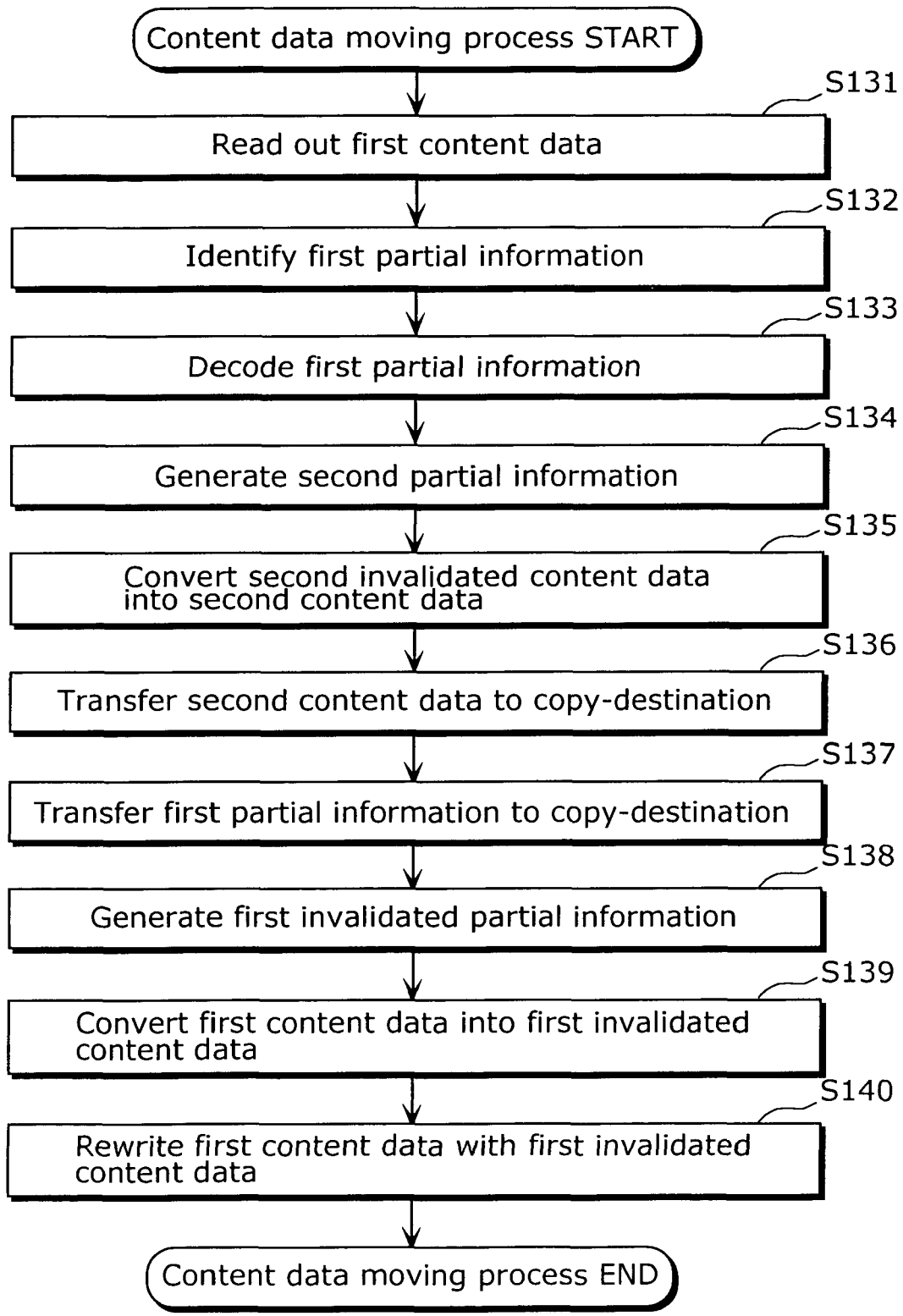
FIG. 13 is a second diagram showing an operation performed by the recorder/reproducer according to the embodiment of the present invention at the time of moving the content data.

To be more specific, as shown in FIG. 13, in the recorder/reproducer 101, the invalidation/validation selection unit 113 reads the first content data recorded in the first content data recording unit 112 (S131), and identifies a first partial information, in the readout first content data, corresponding to a second partial information (S132). The decoding unit 114 decodes the first partial information identified by the invalidation/validation selection unit 113 (S133). The coding unit 115 codes the first partial information decoded by the decoding unit 114, based on the second coding scheme, so as to generate a second partial information (S134). The second invalidated content data validation unit 118 reads the second invalidated content data recorded in the second invalidated content data recording unit 117, validates, using the second partial information generated by the coding unit 114, the second invalidated partial information of the readout second invalidated content data, converts the second invalidated content data into a second content data (S135), and records such second content data into the content data recording area 106 in the portable medium 104 via the reading and writing unit 119 (S136). Furthermore, the first partial information is recorded into the partial information recording area 105 in the portable medium 104 via the reading and writing unit 119 (S137). Then, the first content data invalidation unit 120 generates a first invalidated partial information (S138), invalidates the first partial information using such generated first invalidated partial information, so as to convert the first content data into a first invalidated content data (S139), and rewrites the first content data recorded in the first content data recording unit 112 with the first invalidated content data (S140).

At this time, in the invalidation/validation selection unit 113, the first content data analysis unit 122 reads the first content data recorded in the first content data recording unit 112, and analyzes such readout first content data. The analyzed first content data is moved to the coding unit 115. The first content data invalidation/validation determination unit 123 determines whether or not the first partial information corresponds to the first invalidated partial information, based on the result of the analysis made by the first content data analysis unit 122. In the case where the result of the determination made by the first content data invalidation/validation determination unit 123 is that it is the corresponding first partial information, the decoding unit 114 decodes such first partial information corresponding to the first invalidated partial information. Such decoded first partial information is coded based on the second coding scheme, so as to generate a second partial information.

Furthermore, in the second invalidated content data validation unit 118, the second invalidated content data synthesis unit 126 synthesizes the second invalidated content data read from the second invalidated content data recording unit 117 and the second partial information generated by the coding unit 115, based on the result of the determination made by the first content data invalidation/validation determination unit 123, so as to validate the second content data. Such validated second content data is recorded into the content data recording area 106 in the portable medium 104 via the reading and writing unit 119.

Furthermore, in the invalidation/validation selection unit 113, the first content data analysis unit 122 reads the first content data recorded in the first content data recording unit 112, and analyzes such readout first content data. The analyzed first content data is transferred to the invalidation data synthesis unit 614. The first content data invalidation/validation determination unit 123 determines whether or not the first partial information should be invalidated, based on the result of the analysis made by the first content data analysis unit 122. The result of such determination is transferred to the first invalidation data synthesis unit 128.

Furthermore, in the first content data invalidation unit 120, the first invalidation data synthesis unit 128 records the first partial information transferred from the first content data analysis unit 122 into the partial information recording area 105 in the portable medium 104 via the reading and writing unit 119, before synthesizing it with the first invalidated partial information. Then, the first invalidation data generation unit 127 generates a first invalidated partial information. The first invalidation data synthesis unit 128 synthesizes the first partial information transferred from the first content data analysis unit 122 and the first invalidated partial information transferred from the first invalidation data generation unit 127, based on the result of the determination made by the first content data invalidation/validation determination unit 123, so as to invalidate the first partial information. Such invalidated first partial information, i.e., first invalidated partial information is recorded into the first content data recording unit 112.

Note that in the second invalidated content data validation unit 118, in the case of validating the second invalidated content data coded in accordance with MPEG-4, the content data synthesis unit 818 validates the second content data by replacing a picture determined as an I-Picture by the invalidation/validation selection unit 113 with the second partial information transferred from the coding unit 115.

Furthermore, in the first content data invalidation unit 120, in the case of invalidating the first content data coded in accordance with MPEG-2, the first invalidation data synthesis unit 128 invalidates the first content data by replacing, by the invalidation data generated by the first invalidation data generation unit 127, the top 1-byte data in the first macroblock data included in each slice of a picture determined as an I-Picture by the first content data invalidation/validation determination unit 123.

Next, a description is given of the operation performed by the recorder/reproducer 101 at the time of restoring the content data.

Figure 14:
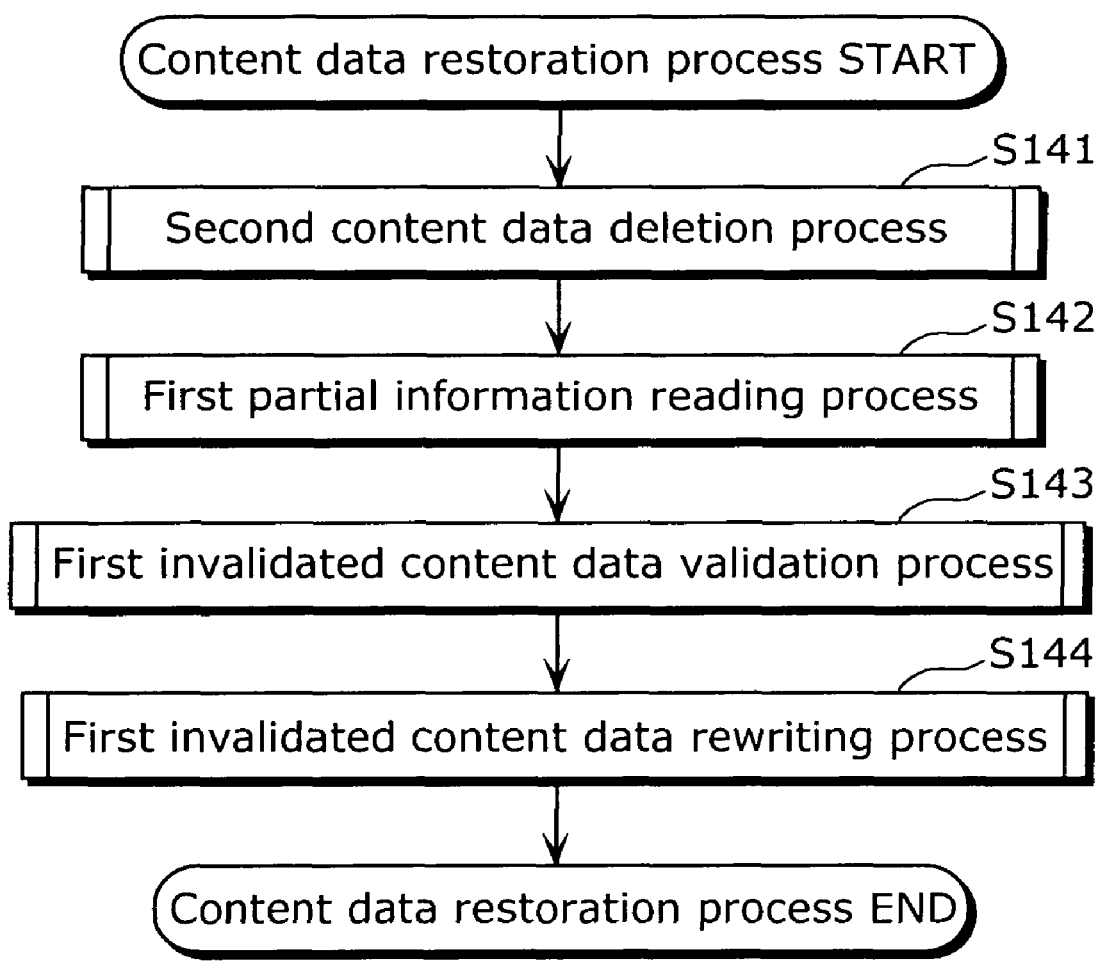
FIG. 14 is a first diagram showing an operation performed by the recorder/reproducer according to the embodiment of the present invention at the time of restoring the content data.

As shown in FIG. 14, the recorder/reproducer 101, in the case of restoring the content data from the copy-destination, executes a second content data deletion process (S141), a first partial information reading process (S142), a first invalidated content data validation process (S143), and a first invalidated content data rewriting process (S144). Then, the recorder/reproducer 101 validates the invalidated first content data, using the first partial information recorded in the partial information recording area 105 in the portable medium 104.

The "second content data deletion process" refers to a process of deleting the second content data recorded in the content recording area 106 in the portable medium 104.

The "first partial information reading process" refers to a process of reading the first partial information from the partial information recording area 105 in the portable medium 104.

The "first invalidated content data validation process" refers to a process of validating the first invalidated content data recorded in the first content data recording unit 112, using the first partial information.

The "first invalidated content data rewriting process" refers to a process of rewriting the first invalidated content data recorded in the first content data recording unit 112 with the first content data.

Figure 15:
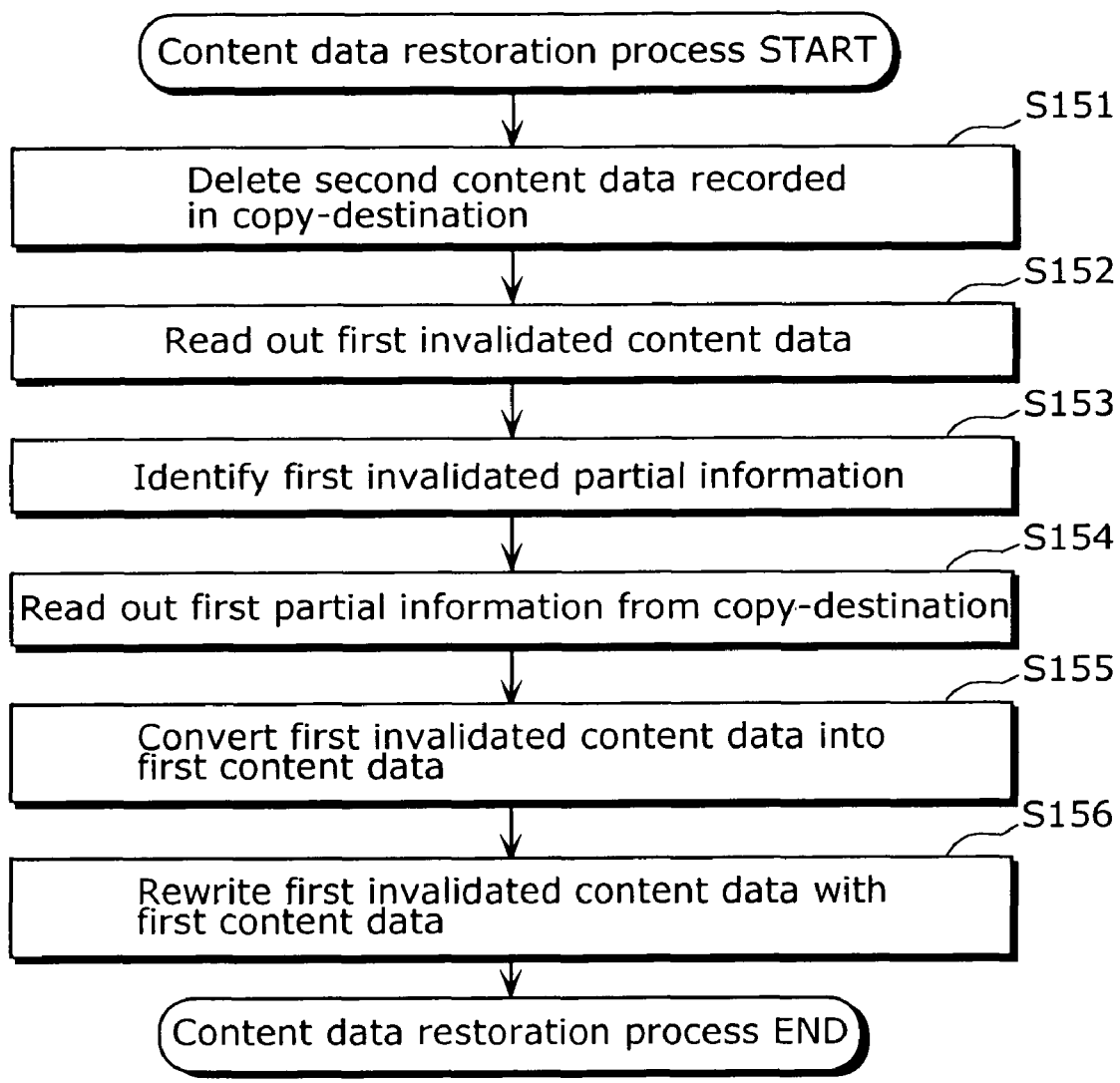
FIG. 15 is a second diagram showing an operation performed by the recorder/reproducer according to the embodiment of the present invention at the time of restoring the content data.

To be more specific, as shown in FIG. 15, the recorder/reproducer 101 deletes the second content data recorded in the content data recording area 106 in the portable medium 104 (S151). Furthermore, the invalidation/validation selection unit 113 reads the first invalidated content data recorded in the first content data recording unit 112 (S152), and identifies the first invalidated partial information in the readout first invalidated content data (S153). The second invalidated content data validation unit 121 reads the first partial information recorded in the partial information recording area 105 in the portable medium 104 (S154), validates the first invalidated partial information identified by the invalidation/validation selection unit 113, using such readout first partial information, so as to convert the first invalidated content data into the first content data (S155), and rewrites the first invalidated content data recorded in the first content data recording unit 112 with the first content data (S156).

At this time, in the invalidation/validation selection unit 113, the first content data analysis unit 122 reads the first invalidated content data recorded in the first content data recording unit 112, and analyzes such readout first invalidated content data. The first content data invalidation/validation determination unit 123 determines whether or not the first invalidated partial information is included, based on the result of the analysis made by the first content data analysis unit 122. The result of such determination and the first invalidated partial information are transferred to the first invalidated content data synthesis unit 129.

Furthermore, in the second invalidated content data validation unit 121, the first partial information analysis unit 130 reads the first partial information from the partial information recording area 105 in the portable medium 104 via the reading and writing unit 119, and analyzes such readout first partial information. The result of such analysis and the first partial information are transferred to the first invalidated content data synthesis unit 129. The first invalidated content data synthesis unit 129 synthesizes the first invalidated partial information transferred from the first content data analysis unit 122 and the first partial information transferred from the first partial information analysis unit 130, based on the result of the analysis made by the first content data analysis unit 122 and the result of the determination made by the first content data invalidation/validation determination unit 123, so as to validate the first invalidated partial information. Such validated first partial information is recorded into the first content data recording unit 112.

Note that in the second invalidated content data validation unit 121, in the case of validating the invalidated first content data which is coded in accordance with MPEG-2, i.e., the first invalidated content data, the first invalidated content data synthesis unit 129 validates the first invalidated content data by replacing, by the first partial information transferred from the first partial information analysis unit 130, a picture determined as an I-Picture by the first content data invalidation/validation determination unit 123.

As described above, according to the recorder/reproducer 101 of the present embodiment, it is possible, at the time of moving content data, to invalidate the recorded content data by invalidating a part of such copy-source content data without deleting the whole of such content data. Meanwhile, in the case of returning the moved content data back to the recorder/reproducer 101, it is possible to restore the original high image quality of the content data by making it perfect data using the partial data.

What is more, by changing the size of content data or coding it in accordance with a different coding scheme and by invalidating a part of such content data, at the time of recording the original content data into the recorder/reproducer 101, it is possible to transfer only the least limited content data to the copy-destination and thus to move the content data at high speed, without having to hold two pieces of reproducible content data in a single recorder/reproducer at the same time.

(Others)

(1) Note that, in the case of invalidating content data of a TransPort Stream (TS) of MPEG-2 Systems, the first content data invalidation unit 120 or the second content data invalidation unit 116 may invalidate the whole or a part of a TS packet including the top data in each slice in a key frame.

Figure 16:
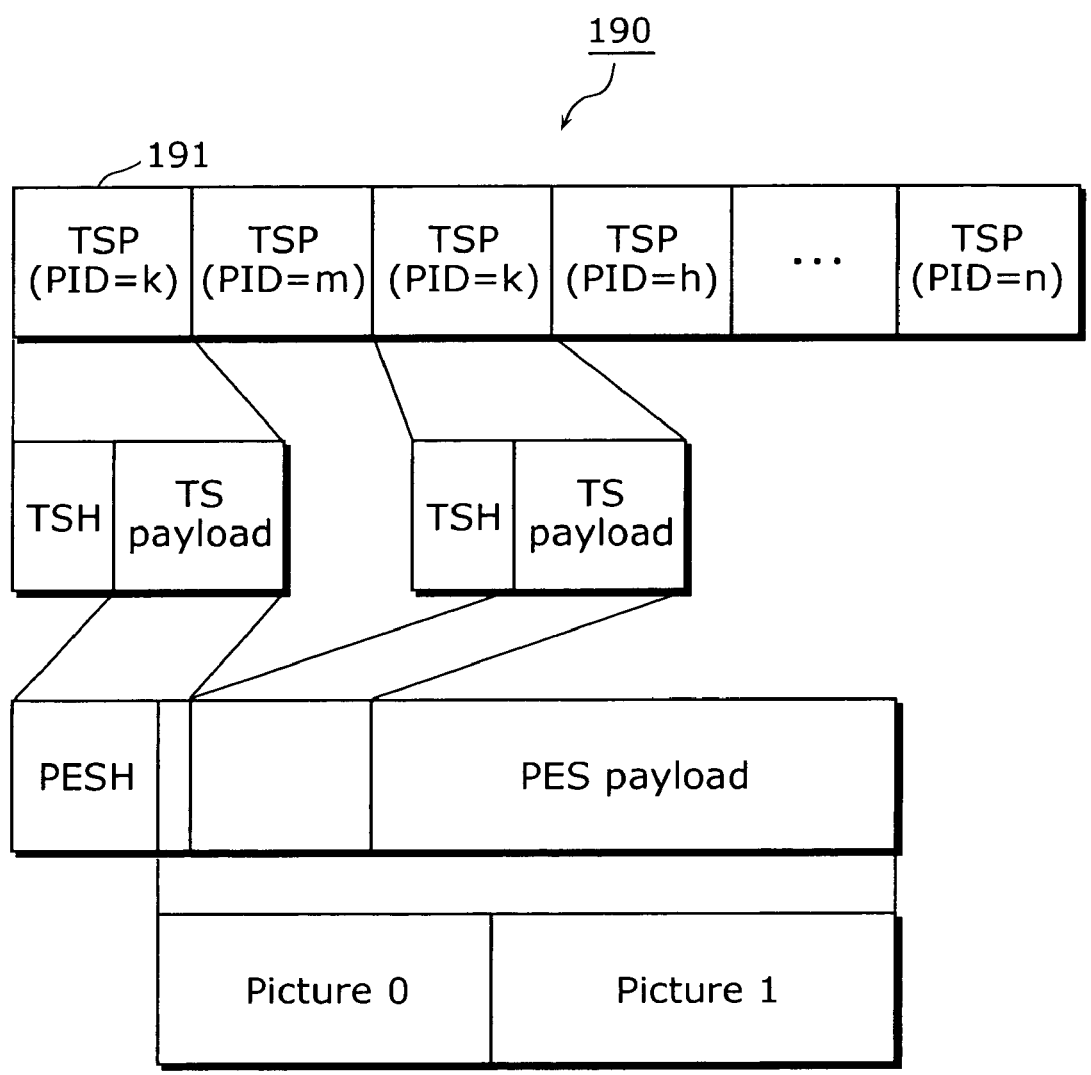
FIG. 16 is a diagram showing a syntax of MPEG-2 Systems Transport Stream.

For example, as shown in FIG. 16, video/audio data of a TS of MPEG-2 Systems are packetized into fixed length units called TS packets which are suitable for the transmission of satellite broadcasting and the like, that is, transmitted in segments. In the case where a first content data or a second content data are included in a TS, therefore, it is possible to invalidate the content data by invalidating a TS packet that includes the top data of each slice in a key frame or by invalidating a part of such TS packet. Since a TS packet including a key frame is a TS packet whose MPEG-2 Systems PES indicator is 1, it is possible to invalidate the content data by invalidating such TS packet or a part of such TS packet.

(2) Note that, in the case of invalidating content data of a program stream (PS) of MPEG-2 Systems, a pack that includes the top data of each slice in a key frame or a part of such pack may be invalidated.

Figure 17:
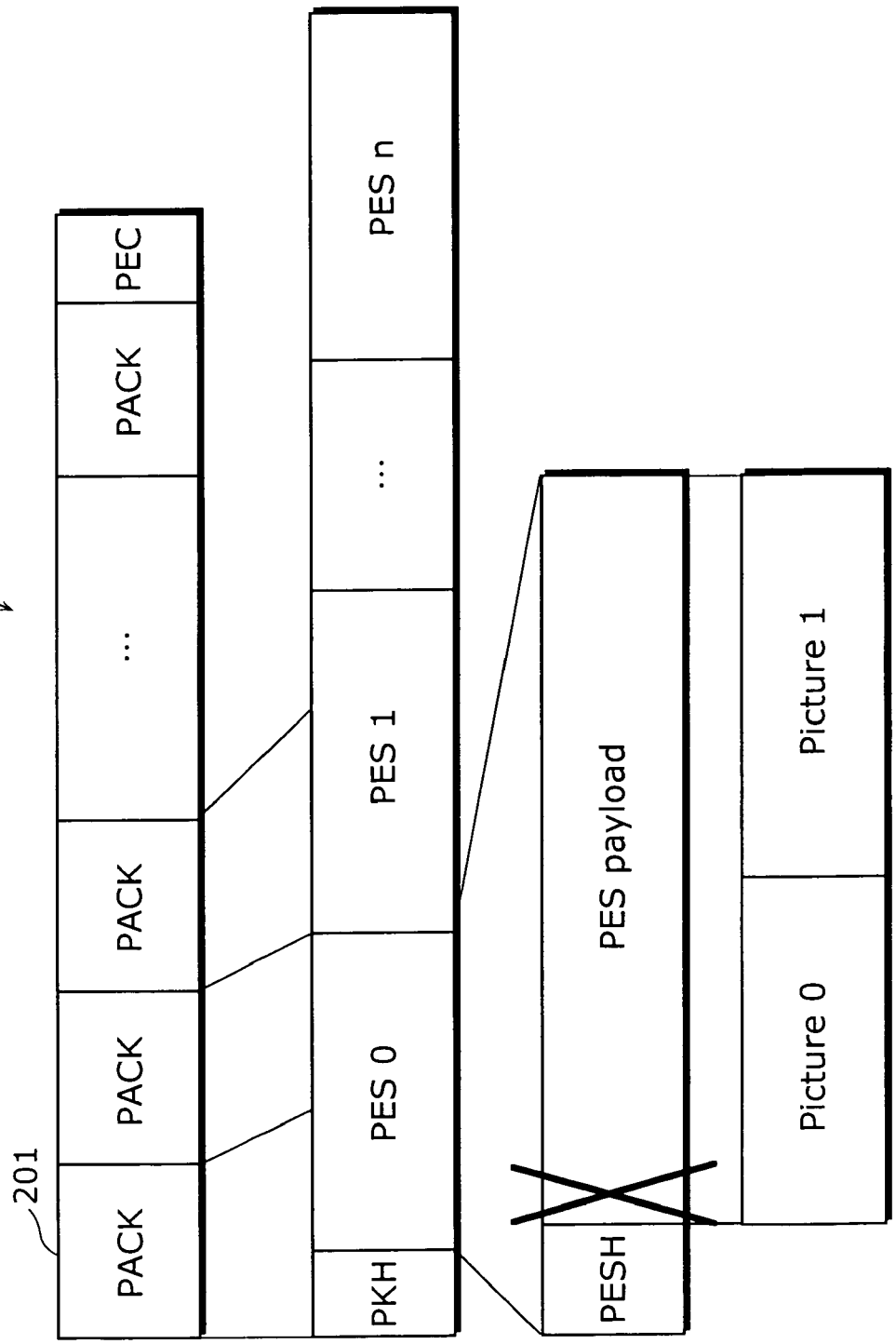
FIG. 17 is a diagram showing a syntax of MPEG-2 Systems Program Stream.

For example, as shown in FIG. 17, video/audio data of a PS of MPEG-2 Systems are packetized (segmented) into units called packs which are suitable for the storage into a DVD and the like, and transmitted. Therefore, in the case where a first content data and a converted second content data are included in a PS, it is possible to invalidate the content data by invalidating the whole or a part of a pack including the top data of each slice in a key frame.

(3) Note that information may be invalidated/validated of an I-Picture or a sector including an area where configuration information required to reproduce audio data is stored.

Figure 18:
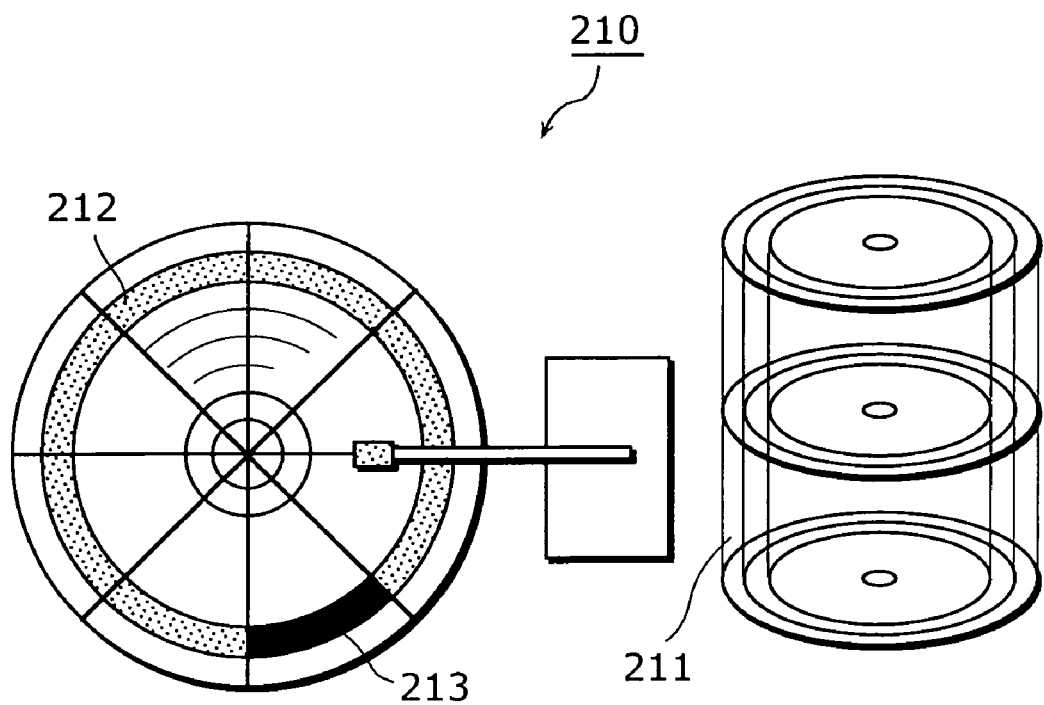
FIG. 18 is a diagram showing a typical recording medium.

For example, as shown in FIG. 18, in a disk-type recording device such as a hard disk, a disk is managed in units of plural sectors. By invalidating an I-Picture or a sector including an area where configuration information that is required to reproduce audio data is stored, it is possible to invalidate intended content data, while facilitating an access to the disk.

(4) Note that, instead of moving content data from the recorder/reproducer to the portable medium or moving content data from the portable medium to the recorder/reproducer, content data may be moved from, for example, the recorder/reproducer to another recorder/reproducer.

(5) Note that, in the case of moving content data from the portable medium to the recorder/reproducer, the content data may be made unusable by deleting, for example, only partial information required for decoding, without deleting the content data to be recorded onto the portable medium, instead of deleting various kinds of data to be recorded onto the portable medium. Furthermore, the content data may be made unusable by destroying a part of the data, rather than by deleting the data.

(6) Note that instead of recording partial information directly onto the portable medium, the partial information may be recorded after being encrypted with an arbitrary encryption key, or an encryption key generated for encryption may be recorded as a second partial information required for reproduction.

(7) Note that, other than being supplied from an external device such as the content data supply device 102, content data may be supplied via a recording medium.

(8) Note that as intervals of invalidating content data, for pictures represented by those of MPEG, an N-multiple (N is a two or greater natural number) of intervals at which I-Pictures are inserted, may serve as intervals, instead of intervals at which I-Pictures required for reproduction are inserted. This makes it possible to reduce the data size of partial information to be invalidated as well as reducing the amount of processing required for invalidation/validation to one Nth.

(9) Note that instead of using intervals at which I-Pictures required for reproduction are inserted as intervals of invalidating content data, P-pictures used for reference of a temporally close picture or B-pictures used for reference may be used, instead of always using I-Pictures for content data of both the copy-source and copy-destination.

(10) Note that the invalidation/validation selection unit 113 may have the function realized by one of the second content data invalidation unit 116, the first content data invalidation unit 120, the second invalidated content data validation unit 118, and the second invalidated content data validation unit 121.

(11) Note that it is not necessary to invalidate each of all slices, and thus invalidation may be performed only on every other slice or randomly-selected slices, instead of invalidating the data of the top macroblock of each slice constituting an I-Picture.

(12) Note that instead of invalidating 1-byte data of the top macroblock data in each slice, invalidation may be performed for data at an arbitrary position where it is easy to perform processing or for data of an arbitrary size.

(13) Note that invalidation/validation of data may be performed in the case where data is moved after being converted from MPEG-2 to MPEG-4 AVC (H.264), from MPEG-2 Systems TS to MPEG-2 Systems PS, or a combination of these, other than being converted from MPEG-2 to MPEG-4.

(14) Note that in the case of invalidating audio data, PES_Length may be detected so as to invalidate such detected PES_Length. This makes it possible to make the original content data imperfect.

Figure 19:
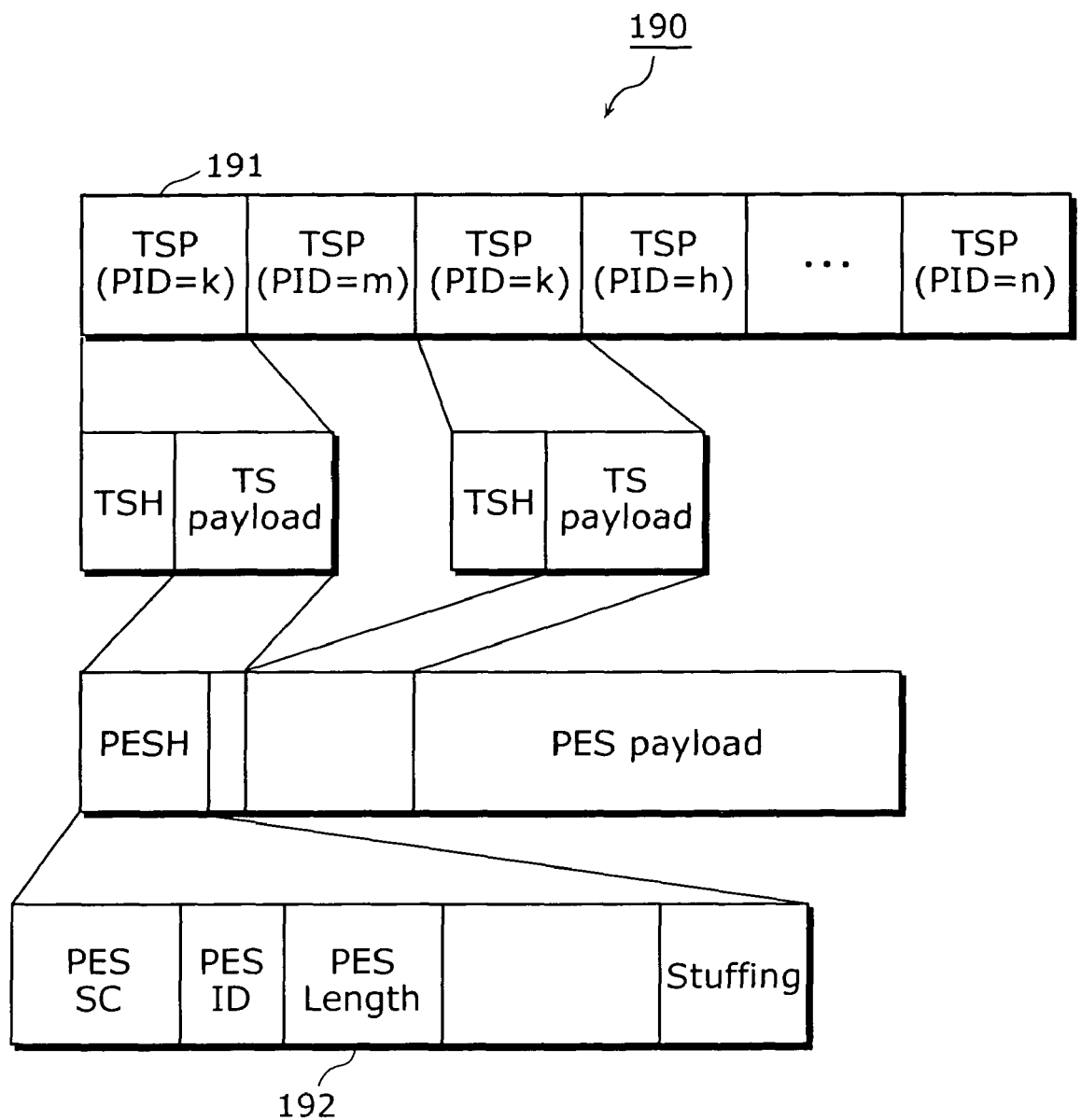
FIG. 19 is a diagram showing a syntax of MPEG-2 Systems Transport Stream.

For example, as shown in FIG. 19, in the case of converting audio data into a packetized elementary stream (PES), it is usual that one PES is constituted by plural pieces of audio data. In this case, the size of the PES is stored in a field called PES_Length 192. Thus, it is possible to make the audio data imperfect by invalidating PES_Length.

(15) Note that, although not illustrated in the drawing, in the case of invalidating content data of MPEG-4 MP4, which is a file multiplexing scheme, Sample size boxes or Sample to Chunk Boxes, which are essential information for successful reproduction, may be invalidated.

(16) Note that instead of performing invalidation at the level of elementary stream, which is coded video, invalidation may be performed for any of the following included in data packetized in accordance with Advanced System Format (ASF) developed by Microsoft Corporation: I-Picture; a part of a packet that includes data required for reproduction; and the whole of such packet.

(17) Each of the functional blocks illustrated in block diagrams such as FIG. 3 and FIG. 4, are implemented typically as an LSI which is an integrated circuit. These may be individually implemented as one chip, or some or all of these may be implemented as one chip. Alternatively, functional blocks other than memory may be implemented as one chip. Here, an LSI is described, but it can be referred to as an IC, a system LSI, a super LSI, or an ultra LSI, depending on its degree of integration. The method for incorporation into an integrated circuit is not limited to an LSI, and it may be implemented as a private line or a general processor. After manufacturing of the LSI, a Field Programmable Gate Array (FPGA) that is programmable, or a reconfigurable processor in which the connection and setting of the circuit cell in the LSI is reconfigurable, may be utilized. Furthermore, along with the arrival of technique for incorporation into an integrated circuit that replaces the LSI owing to a progress in semiconductor technology or another technique that derives from it, integration of the function blocks may be carried out using such newly-arrived technology. Bio-technology may be cited as one of the examples. Among the functional blocks, only a unit for storing data to be coded or decoded may be constructed separately without being incorporated in a chip form.

(18) Note that the recorder/reproducer of the present embodiment is equipped with a central processing unit (CPU), a Random Access Memory (RAM), a Read Only Memory (ROM), a drive, or the like.

"Drive" refers to a device capable of reading and writing data from and to any of a recording medium such as a hard disk (HD), a DVD-RAM, a BD-RE (Blu-ray Disk Rewritable), and Secure Digital (SD) memory card, and the like.

Furthermore, it is possible that an operating system (OS) for controlling the recorder/reproducer is installed in a ROM or any of the above recording medium, and each function of the recorder/reproducer may be implemented by the execution of such OS. Alternatively, an application program which is executed on the running OS is installed, and each function may be implemented by the execution of such application program.

(19) Note that in the case where a program that realizes each function of the recorder/reproducer of the present embodiment by being executed by the recorder/reproducer, is implemented as a recording/reproduction control program, such recording/reproduction control program may be recorded on a computer-readable recording medium such as an optical recording medium (e.g., CD-ROM), a magnetic recording medium (e.g., HD), a magneto optic recording medium (e.g., MO), and a semiconductor memory (e.g., memory card) so that such recording/reproduction control program can be readout by a hardware system such as a computer system and a built-in system. Such recording/reproduction control program may be executed in another hardware system via any of these recording media.

Furthermore, it is also possible that the recording/reproduction control program is held in a hardware system on a network, so that such recording/reproduction control program is executed in another hardware system that downloads the recording/reproduction control program over the network.

(20) Note that the recorder/reproducer may include an I/O interface, and may receive content data from another external device or a recording medium and transmit content data to another device or a recording medium via such I/O interface.

(21) Note that it is not necessary that the generation of a second content data is performed simultaneously with the recording of a first content data into the recorder/reproducer, and thus a second content data may be generated when the recorder/reproducer is not performing recording.

The present invention is applicable for use as a recorder/reproducer that prevents an unauthorized copying of recorded content data, and particularly as a recorder/reproducer or the like that is capable of restoring the original high image quality of content data, whose image quality has been degraded through compression conversion at the time of moving it to the copy-destination, even when such content data is returned to the recorder/reproducer from the copy destination.

The invention claimed is:

1. A recorder/reproducer, comprising:
a content data moving unit operable to:
write a second content data that is reproducible into a second recording medium that is different from a first recording medium, the second content data being obtained by re-coding a first content data recorded in the first recording medium,
write a first partial information extracted from the first content data into the second recording medium,
generate a first invalidated partial content corresponding to the extracted first partial information, and
insert the first invalidated partial content into the first content data thereby making the first content data irreproducible;
a memory device, the memory device being a non-transitory computer-readable recording medium; and
a content data restoration unit operable to make the first content data recorded in the first recording medium reproducible using the first partial information recorded in the second recording medium.

2. The recorder/reproducer according to claim 1, further comprising
a content data obtainment unit operable to:
accumulate the first content data;
generate the second content data from the first content data;
generate a second invalidated partial content based on the first partial information extracted from the first content data, and
insert the second invalidated partial content into the second content data thereby making the second content data irreproducible,
wherein said content data moving unit, when writing the second content data into the second recording medium, is operable to make the second content data reproducible, using the second partial information corresponding to the first partial information extracted from the first content data.

3. The recorder/reproducer according to claim 1,
wherein said content data moving unit is operable to generate the first invalidated partial information corresponding to the extracted first partial information, and to make the first content data irreproducible by replacing the first partial information included in the first content data with the generated first invalidated partial information, and
said content data restoration unit is operable to make the first content data reproducible by replacing the first invalidated partial information included in the irreproducible first content data with the first partial information recorded in the second recording medium.

4. The recorder/reproducer according to claim 3,
wherein said content data moving unit is operable to write, into the second recording medium, the first partial information extracted from the first content data, before replacing the first partial information included in the first content data with the generated first invalidated partial information.

5. The recorder/reproducer according to claim 3,
wherein said content data moving unit is operable to replace the first partial information included in the first content data with the generated first invalidated partial information, while writing, into the second recording medium, the second content data that is obtained by re-coding the first content data.

6. The recorder/reproducer according to claim 2,
wherein said content data moving unit is operable to:
generate the second invalidated partial information corresponding to the extracted second partial information, and make the second content data irreproducible by replacing the second partial information included in the generated second content data with the generated second invalidated partial information; and
when making the irreproducible second content data reproducible, generate the second partial information corresponding to the extracted first partial information, and make the irreproducible second content data reproducible by replacing the second invalidated partial information included in the irreproducible second content data with the generated second partial information.

7. The recorder/reproducer according to claim 3,
wherein said content data moving unit is operable to replace the first partial information included in the first content data with the generated first invalidated partial information, while replacing the second invalidated partial information included in the irreproducible second content data with the generated second partial information.

8. The recorder/reproducer according to claim 1, further comprising
an accumulation unit operable to accumulate the first content data segmented into blocks,
wherein said content data moving unit is operable to extract, from the blocks, a predetermined block as the first partial information.

9. The recorder/reproducer according to claim 1,
wherein said content data moving unit is operable to extract one of the following as the first partial information, in the case where the first content data is content data multiplexed as a transport stream of MPEG-2 Systems: (a) a part of data of a TS packet constituting the first content data; (b) a part of data of a PES packet included in a payload of a TS packet constituting the first content data; (c) a part of data of a TS packet including a non-reference frame, out of TS packets constituting the first content data; and (d) a part of data of a TS packet in which an indicator of a PES packet indicates the value of 1, the PES packet being included in the TS Packet constituting the first content data.

10. The recorder/reproducer according to claim 1,
wherein said content data moving unit is operable to extract, as the first partial information, a part of data of a PS packet constituting the first content data, in the case where the first content data is content data multiplexed as a program stream of MPEG-2 Systems.

11. The recorder/reproducer according to claim 1,
wherein said content data moving unit is operable to extract one of the following as the first partial information, in the case where the first content data is content data that is coded in accordance with MP4: (a) a part of data of information indicating a Sample Size Boxes included in the first content data; and (b) a part of data of information indicating a Sample to Chunk Boxes included in the first content data.

12. The recorder/reproducer according to claim 1,
wherein said content data moving unit is operable to extract, as the first partial information, a part of data of information indicating a Slice Header included in the first content data, in the case where the first content data is content data that is coded in accordance with MPEG-2Video.

13. The recorder/reproducer according to claim 1,
wherein said content data moving unit is operable to extract one of the following as the first partial information, in the case where the first content data is content data that is coded in accordance with MPEG-4Video: (a) a part of data of information indicating a Video Object Place Header included in the first content data; and (b) a part of data of information indicating "Video Packet Header" included in the first content data.

14. The recorder/reproducer according to claim 1,
wherein said content data moving unit is operable to extract, as the first partial information, a part of data of information indicating an RTSPHeader included in the first content data, in the case where the first content data is content data that is coded in accordance with MPEG-4AVC, ITU-T H.264.

15. The recorder/reproducer according to claim 2, further comprising
an accumulation unit operable to accumulate the second content data segmented into blocks,
wherein said content data moving unit is operable to extract, from the blocks, a predetermined block as the second partial information.

16. The recorder/reproducer according to claim 2,
wherein said content data moving unit is operable to extract one of the following as the second partial information, in the case where the second content data is content data multiplexed as a transport stream of MPEG-2 Systems: (a) a part of data of a TS packet constituting the second content data; (b) a part of data of a PES packet included in a payload of a TS packet constituting the second content data; (c) a part of data of a TS packet including a non-reference frame, out of TS packets constituting the second content data; and (d) a part of data of a TS packet in which an indicator of a PES packet indicates a value of 1, the PES packet being included in the TS Packet constituting the second content data.

17. The recorder/reproducer according to claim 2,
wherein said content data moving unit is operable to extract, as the second partial information, a part of data of a PS packet constituting the second content data, in the case where the second content data is content data multiplexed as a program stream of MPEG-2 Systems.

18. The recorder/reproducer according to claim 2,
wherein said content data moving unit is operable to extract one of the following as the second partial information, in the case where the second content data is content data that is coded in accordance with MP4: (a) a part of data of information indicating a Sample Size Boxes included in the second content data; and (b) a part of data of information indicating "Sample to Chunk Boxes" included in the second content data.

19. The recorder/reproducer according to claim 2,
wherein said content data moving unit is operable to extract, as the second partial information, a part of data of information indicating a Slice Header included in the second content data, in the case where the second content data is content data that is coded in accordance with MPEG-2Video.

20. The recorder/reproducer according to claim 2,
wherein said content data moving unit is operable to extract one of the following as the second partial information, in the case where the second content data is content data that is coded in accordance with MPEG-4Video: (a) a part of data of information indicating a Video Object Place Header included in the second content data; and (b) a part of data of information indicating a Video Packet Header included in the first content data.

21. The recorder/reproducer according to claim 2,
wherein said content data moving unit is operable to extract, as the second partial information, a part of data of information indicating an RTSPHeader included in the second content data, in the case where the second content data is content data that is coded in accordance with MPEG-4AVC, ITU-T H.264.

22. A recording/reproduction method comprising:
a content data moving step of:
writing a second content data that is reproducible into a second recording medium that is different from a first recording medium, the second content data being obtained by re-coding a first content data recorded in the first recording medium,
writing a first partial information extracted from the first content data into the second recording medium,
generating a first invalidated partial content corresponding to the first partial information extracted from the first content data,
inserting the first invalidated partial content into the first content data thereby making the first content data irreproducible; and
a content data restoration step of making, using a content data restoration unit, the first content data recorded in the first recording medium reproducible using the first partial information recorded in the second recording medium.

23. A recording/reproduction program stored on a non-transitory computer-readable recording medium for causing a computer system to execute:
a content data moving step of:
writing a second content data that is reproducible into a second recording medium that is different from a first recording medium, the second content data being obtained by re-coding a first content data recorded in the first recording medium,
writing a first partial information extracted from the first content data into the second recording medium,
generating a first invalidated partial content corresponding to the first partial information extracted from the first content data, and
inserting the first invalidated partial content into the first content data thereby making the first content data irreproducible; and
a content data restoration step of making the first content data recorded in the first recording medium reproducible using the first partial information recorded in the second recording medium.

24. A semiconductor device comprising:
a content data moving unit operable to:
write a second content data that is reproducible into a second recording medium that is different from a first recording medium, the second content data being obtained by re-coding a first content data recorded in the first recording medium,
write a first partial information extracted from the first content data into the second recording medium,
generate a first invalidated partial content corresponding to the extracted first partial information, and
insert the first invalidated partial content into the first content data thereby making the first content data irreproducible;
a memory device, the memory device being a non-transitory computer-readable recording medium; and
a content data restoration unit operable to make the first content data recorded in the first recording medium reproducible using the first partial information recorded in the second recording medium.

* * * * *